(12) United States Patent
Fath et al.

(10) Patent No.: US 11,021,312 B2
(45) Date of Patent: Jun. 1, 2021

(54) POUCH WITH OXYGEN SCAVENGER AND METHOD OF FORMING POUCH WITH OXYGEN SCAVENGER

(71) Applicant: Altria Client Services LLC, Richmond, VA (US)

(72) Inventors: Scott A. Fath, Richmond, VA (US); Robert T. Mitten, Glen Allen, VA (US); Jason A. Macko, Henrico, VA (US)

(73) Assignee: Altria Client Services LLC, Richmond, VA (US)

( * ) Notice: Subject to any disclaimer, the term of this patent is extended or adjusted under 35 U.S.C. 154(b) by 82 days.

(21) Appl. No.: 16/229,550

(22) Filed: Dec. 21, 2018

(65) Prior Publication Data

US 2020/0198870 A1    Jun. 25, 2020

(51) Int. Cl.
  *B65D 81/26*  (2006.01)
  *B32B 15/20*  (2006.01)
  *B32B 25/18*  (2006.01)
  *B32B 27/30*  (2006.01)

(52) U.S. Cl.
  CPC ............ *B65D 81/266* (2013.01); *B32B 15/20* (2013.01); *B32B 25/18* (2013.01); *B32B 27/306* (2013.01); *B32B 2307/7244* (2013.01); *B32B 2307/7246* (2013.01); *B32B 2307/7265* (2013.01)

(58) Field of Classification Search
  CPC ......... B32B 15/20; B32B 25/18; B32B 27/30; B32B 27/306; B32B 2307/7244; B32B 2307/7246; B32B 2307/7265; B65D 81/20; B65D 81/2084; B65D 81/24; B65D 81/26; B65D 81/266; B65D 81/268
  USPC .................. 206/204, 205; 426/106–127
  See application file for complete search history.

(56) References Cited

U.S. PATENT DOCUMENTS

| 4,764,404 A | 8/1988 | Genske et al. |
| 5,077,104 A | 12/1991 | Hunt et al. |
| 5,551,557 A * | 9/1996 | Brooks ............... B65D 81/266 206/204 |
| 5,667,863 A | 9/1997 | Cullen et al. |
| 5,698,250 A * | 12/1997 | DelDuca ................. A23B 4/16 206/557 |

(Continued)

FOREIGN PATENT DOCUMENTS

| JP | H03148406 A | 6/1991 |
| WO | WO-9824625 A1 | 6/1998 |

OTHER PUBLICATIONS

CSP Technologies, "Moisture- and Oxygen-absorbing Films", retrieved Mar. 1, 2016.

(Continued)

*Primary Examiner* — Bryon P Gehman
(74) *Attorney, Agent, or Firm* — Harness, Dickey & Pierce, P.L.C.

(57) ABSTRACT

The pouch includes a pouch material defining an inner cavity, the pouch material includes a first polymer layer and a gas impermeable layer, the first polymer layer forms an inner surface of the inner cavity, a consumable item in the inner cavity, and an oxygen scavenger, the oxygen scavenger includes at least one active element dispersed within a matrix material, the oxygen scavenger is at least partially connected to the first polymer layer within the inner cavity, and the first polymer layer and the matrix material both include a first polymer material.

46 Claims, 15 Drawing Sheets

(56) References Cited

U.S. PATENT DOCUMENTS

| | | | | |
|---|---|---|---|---|
| 6,054,153 | A * | 4/2000 | Carr | B65D 81/268 |
| | | | | 206/557 |
| 6,071,626 | A * | 6/2000 | Frisk | B32B 7/02 |
| | | | | 428/34.7 |
| 6,119,853 | A * | 9/2000 | Garrill | B65D 81/268 |
| | | | | 206/204 |
| 6,183,790 | B1 * | 2/2001 | DelDuca | A23B 4/16 |
| | | | | 206/557 |
| 6,274,210 | B1 * | 8/2001 | Ebner | A23L 3/3436 |
| | | | | 206/204 |
| 6,325,974 | B1 | 12/2001 | Ahvenainen et al. | |
| 6,688,468 | B2 | 2/2004 | Waterman | |
| 6,746,772 | B2 | 6/2004 | Kashiba et al. | |
| 7,285,334 | B1 | 10/2007 | Yamashita et al. | |
| 7,494,605 | B2 | 2/2009 | Dayrit et al. | |
| 7,708,719 | B2 * | 5/2010 | Wilmot | A61J 1/062 |
| | | | | 206/364 |
| 8,623,481 | B2 * | 1/2014 | Chau | B32B 5/142 |
| | | | | 428/35.2 |
| 8,985,322 | B2 * | 3/2015 | Cullison | B65D 75/42 |
| | | | | 206/204 |
| 9,199,778 | B2 * | 12/2015 | Masuda | B32B 27/34 |
| 9,248,229 | B2 | 2/2016 | Devouassoux et al. | |
| 9,617,049 | B2 * | 4/2017 | Dey | B32B 15/06 |
| 10,518,243 | B2 * | 12/2019 | Macko | A24F 47/008 |
| 2005/0085577 | A1 | 4/2005 | Ching et al. | |
| 2009/0269547 | A1 | 10/2009 | Imoda et al. | |
| 2011/0243483 | A1 | 10/2011 | Crump et al. | |
| 2012/0282376 | A1 | 11/2012 | Crawford | |
| 2013/0310252 | A1 | 11/2013 | Sakamoto et al. | |
| 2014/0087033 | A1 * | 3/2014 | McKedy | B65D 81/2084 |
| | | | | 426/124 |
| 2014/0087034 | A1 * | 3/2014 | McKedy | B65D 81/268 |
| | | | | 426/124 |
| 2014/0311099 | A1 * | 10/2014 | Uradnisheck | B32B 27/306 |
| | | | | 53/440 |
| 2014/0366491 | A1 | 12/2014 | McAffer et al. | |
| 2015/0064686 | A1 | 3/2015 | Fuller | |
| 2018/0002061 | A1 | 1/2018 | Mitten et al. | |
| 2018/0354702 | A1 | 12/2018 | Liu et al. | |

OTHER PUBLICATIONS

Sorbentsystems, "Sorbents: Desiccants, Oxygen Absorbers, Silica Gel Paper, Indicators and more . . . ", retrieved Mar. 1, 2016.

Wikipedia, "Oxygen Scavenger", retrieved Mar. 1, 2016.

Mahajan et al., "The Effect of Inert Atmospheric Packaging on Oxidative Degradation in Formulated Granules", Springer Science-Business Media, Inc., 4 pages, 2005.

American Society for Testing and Materials (ASTM) standard D-3985-17, "Standard Test Method of Oxygen Gas Transmission Rate through Plastic Film and Sheeting Using a Coulometric Sensor", Dec. 2017.

American Society for Testing and Materials (ASTM) standard F1249-06, "Standard Test Method for Water Vapor Transmission Rate Through Plastic Film and Sheeting Using a Modulated Infrared Sensor", 2006.

International Search Report dated Mar. 23, 2020, issued in corresponding International Application No. PCT/EP2019/085104.

Written Opinion dated Mar. 23, 2020, issued in corresponding International Application No. PCT/EP2019/085104.

* cited by examiner

POUCH WITH OXYGEN SCAVENGER AND METHOD OF FORMING POUCH WITH OXYGEN SCAVENGER

BACKGROUND

Field

Example embodiments relate generally to a method of forming a pouch with an oxygen scavenger, and a pouch with an oxygen scavenger.

Related Art

Pouches are often used to store, ship and sell consumable items that may be perishable and therefore susceptible to oxygenation. Especially with regard to consumable items, such as elements for electronic vaping (e-vaping) devices where the elements may include a cartridge of an e-vaping device, these consumable items can experience degradation in an oxygenated environment. Such degradation can negatively impact a flavor system of the consumable items.

SUMMARY

At least one example embodiment is directed toward a method of forming a pouch.

In one example embodiment, the method includes adhering an oxygen scavenger to a pouch material, the pouch material being gas and moisture impermeable; enclosing a consumable item within the pouch material; and joining ends of the pouch material to form a sealed inner cavity, the sealed inner cavity containing the consumable item and at least one first portion of the oxygen scavenger.

In one example embodiment, the adhering occurs prior to the joining.

In one example embodiment, the adhering is part of the joining; and the joining includes, forming a seam in the pouch, the oxygen scavenger being at least partially enveloped within the seam, and the at least one first portion of the oxygen scavenger extending from the seam into the sealed inner cavity.

In one example embodiment, the joining includes crimping the ends.

In one example embodiment, the crimping of the ends includes, applying heat to the joined ends of the pouch material to bring the joined ends to a temperature between about 137° C. and 205° C., and applying pressure to the joined ends, the pressure being between about 20 psi and 40 psi, the applying of the heat and pressure occurring over a duration of less than 1 minute.

In one example embodiment, the adhering includes, applying heat to the oxygen scavenger and pressing the oxygen scavenger against at least one first portion of an inner surface of the pouch material, the oxygen scavenger including a matrix material, the matrix material including at least one first polymer material.

In one example embodiment, the inner surface of the pouch material includes at least one first polymer layer.

In one example embodiment, the method further includes forming the at least one first polymer layer to include a sealant that is a polymer-based sealant, a resin-based sealant, or a polymer-based sealant and a resin-based sealant.

In one example embodiment, the at least one first polymer material is polyethylene.

In one example embodiment, the pouch material includes a foil layer.

In one example embodiment, the pouch material further includes at least one polymer layer.

In one example embodiment, the adhering adheres the at least one polymer layer to the oxygen scavenger.

In one example embodiment, the oxygen scavenger includes iron fragments in a matrix material, the matrix material including at least one first polymer material.

In one example embodiment, the adhering, includes infusing the oxygen scavenger and a light-sensitive activator into at least one first portion of an inner surface of the pouch material, the light-sensitive activator being configured to bind with free-oxygen to activate the oxygen scavenger following an exposure to a light source.

In one example embodiment, the method further includes infusing a light-sensitive activator within the oxygen scavenger, and exposing the light-sensitive activator to a light source to cause the light-sensitive activator to bind with free-oxygen to activate the oxygen scavenger.

In one example embodiment, the method further includes reducing an oxygen level in the sealed inner cavity to a level that is 2% oxygen or less within a period of 30 days or less, an initial gas in the sealed inner cavity being ambient air.

In one example embodiment, the method further includes reducing an oxygen level in the sealed inner cavity to a level that is 1% oxygen or less, an initial gas in the sealed inner cavity being ambient air.

In one example embodiment, the consumable item is an e-vaping cartridge with a pre-vapor formulation.

In one example embodiment, the oxygen scavenger is configured to allow oxygen diffusion through the oxygen scavenger.

At least one example embodiment is directed toward a method of forming a pouch.

In one example embodiment, the method includes placing an oxygen scavenger onto a pouch material, the pouch material being gas and moisture impermeable; enclosing a consumable item within the pouch material; and joining ends of the pouch material to form a sealed inner cavity, the sealed inner cavity containing the consumable item and at least one first portion of the oxygen scavenger.

At least one example embodiment id directed toward a pouch.

In one example embodiment, the pouch includes a pouch material defining an inner cavity, the pouch material being gas impermeable; a consumable item in the inner cavity; and an oxygen scavenger, at least one first portion of the oxygen scavenger being in the inner cavity.

In one example embodiment, the pouch material is also moisture impermeable.

In one example embodiment, the oxygen scavenger is adhered to the pouch material.

In one example embodiment, the pouch includes a seam, the oxygen scavenger being at least partially enveloped within the seam, the at least one first portion of the oxygen scavenger extending from the seam into the inner cavity.

In one example embodiment, the pouch material includes a foil layer.

In one example embodiment, the pouch material further includes a polymer layer on an outer surface of the pouch material.

In one example embodiment, the pouch material further includes a polymer layer on an inner surface of the pouch material.

In one example embodiment, the polymer layer has a lower melting point than the foil layer.

In one example embodiment, the oxygen scavenger includes iron fragments.

In one example embodiment, the oxygen scavenger includes iron fragments in a matrix material.

In one example embodiment, the matrix material includes a polymer material.

In one example embodiment, the polymer material has a melting point between about 137° C. and 205° C.

In one example embodiment, the oxygen scavenger is infused within at least one first portion of an inner surface of the pouch material.

In one example embodiment, the pouch further includes a light-sensitive activator.

In one example embodiment, the light-sensitive activator is infused within the oxygen scavenger.

In one example embodiment, the light-sensitive activator is configured to bind with free-oxygen to activate the oxygen scavenger following an exposure to a light source.

In one example embodiment, the oxygen scavenger is configured to reduce an oxygen level in the inner cavity to a level that is 2% oxygen or less within a period of 30 days or less, and an initial gas in the inner cavity is ambient air.

In one example embodiment, the oxygen scavenger is configured to reduce an oxygen level in the inner cavity to a level that is 2% oxygen or less within a period of 17 days or less, and an initial gas in the inner cavity is ambient air.

In one example embodiment, the oxygen scavenger is configured to reduce an oxygen level in the inner cavity to a level that is 1% oxygen or less within a period of 30 days or less, and an initial gas in the inner cavity is ambient air.

In one example embodiment, the consumable item is a part of an e-vaping device that includes a pre-vapor formulation.

At least one example embodiment is directed toward a pouch.

In one example embodiment, the pouch includes a pouch material defining an inner cavity, the pouch material comprising a foil layer; a consumable item in the inner cavity; and an oxygen scavenger, at least one first portion of the oxygen scavenger being in the inner cavity.

In one example embodiment, the pouch material is gas impermeable.

In one example embodiment, the pouch material is moisture impermeable.

In one example embodiment, the oxygen scavenger is adhered to the pouch material.

In one example embodiment, the pouch includes a seam, the oxygen scavenger being at least partially enveloped within the seam, the at least one first portion of the oxygen scavenger extending from the seam into the inner cavity.

In one example embodiment, the pouch material further includes a polymer layer on an outer surface of the pouch material.

In one example embodiment, the pouch material further includes a polymer layer on an inner surface of the pouch material.

In one example embodiment, the polymer layer has a lower melting point than the foil layer.

In one example embodiment, the oxygen scavenger includes iron fragments.

In one example embodiment, the oxygen scavenger includes iron fragments in a matrix material.

In one example embodiment, the matrix material includes a polymer material.

In one example embodiment, the polymer material has a melting point between about 137° C. and 205° C.

In one example embodiment, the oxygen scavenger is infused within at least one first portion of an inner surface of the pouch material.

In one example embodiment, the pouch further includes a light-sensitive activator.

In one example embodiment, the light-sensitive activator is infused within the oxygen scavenger.

In one example embodiment, the light-sensitive activator is configured to bind with free-oxygen to activate the oxygen scavenger following an exposure to a light source.

In one example embodiment, the oxygen scavenger is configured to reduce an oxygen level in the inner cavity to a level that is 2% oxygen or less within a period of 30 days or less, and an initial gas in the inner cavity is ambient air.

In one example embodiment, the oxygen scavenger is configured to reduce an oxygen level in the inner cavity to a level that is 2% oxygen or less within a period of 17 days or less, and an initial gas in the inner cavity is ambient air.

In one example embodiment, the oxygen scavenger is configured to reduce an oxygen level in the inner cavity to a level that is 1% oxygen or less within a period of 30 days or less, and an initial gas in the inner cavity is ambient air.

In one example embodiment, the consumable item is a part of an e-vaping device that includes a pre-vapor formulation.

DETAILED DESCRIPTION

Figure 1:
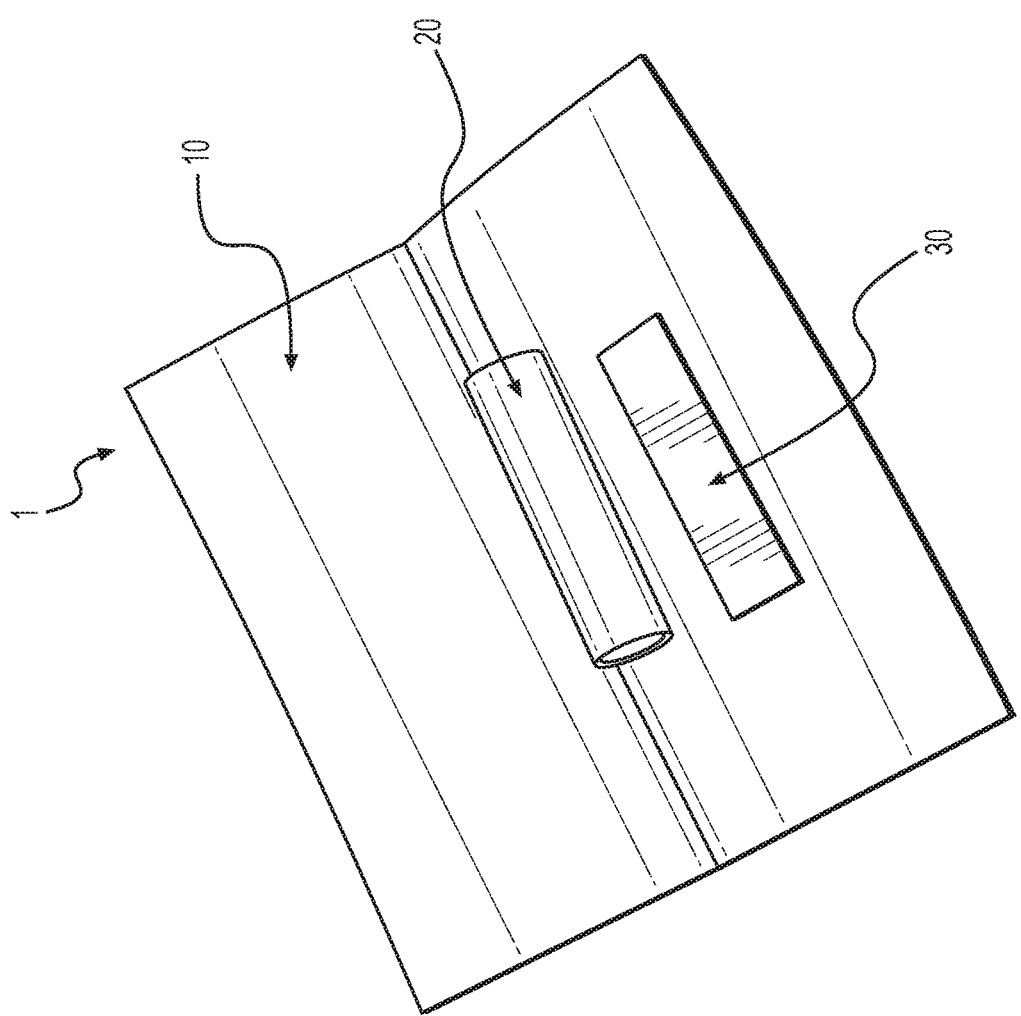
FIG. 1 is an illustration of an unsealed pouch with a consumable item and an oxygen scavenger, in accordance with an example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives thereof. Like numbers refer to like elements throughout the description of the figures.

It should be understood that when an element or layer is referred to as being "on," "connected to," "coupled to," "attached to," "adjacent to," or "covering", etc., another element or layer, it may be directly on, connected to, coupled to, attached to, adjacent to or covering, etc., the other element or layer, or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations or sub-combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

When the words "about" and "substantially" are used in this specification in connection with a numerical value, it is intended that the associated numerical value include a tolerance of ±10% around the stated numerical value, unless otherwise explicitly defined.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 is an illustration of an unsealed pouch 1 with a consumable item (element) 20 and an oxygen scavenger 30, in accordance with an example embodiment. The unsealed pouch 1 includes a sheet of pouch material 10. In some example embodiments, the sheet of pouch material 10 is gas/moisture impermeable. The pouch material 10 may be pliable to more easily be formed into a sealed pouch 1b (see FIG. 3). In some example embodiments, the pouch material 10 provides a barrier that prevents oxygen migration into and out of the sealed pouch 1b. In an example embodiment, the pouch material 10 is a foil, a foil laminate, or a composite material with at least one foil layer. In some examples, the foil may include an aluminum layer, or an aluminum alloy layer. In another embodiment, the pouch material 10 is made from a pliable metalized film. In an example embodiment, the pouch material 10 includes a polymer layer, where the polymer layer may be combined with the foil, foil laminate, composite material, etc. and/or the metalized film. In some examples, the polymer layer may be a low melting point polymer, where the polymer layer covers an inside and/or an outside surface of the pouch material 10. In an example embodiment, the pouch material 10 can withstand crimping and/or heat sealing, where the crimping or heat sealing is performed using an application of heat and/or pressure.

The consumable item 20 may be a non-perishable, perishable or semi-perishable consumable item. In an example embodiment, the consumable item 20 may be an electronic vaping (e-vaping) device, or an element of an e-vaping device, such as an e-vaping cartridge. The consumable item 20 may also include a flavor system within the element.

The oxygen scavenger 30 may come in many forms, and may or may not be in direct contact with the consumable item 20 within the pouch 1. In some examples, the quantity of the oxygen scavenger 30 within the pouch 1 is such that the scavenger 30 is able to remove an expected volumetric quantity of oxygen within an inner cavity of the pouch 1, once the pouch 1 is sealed.

A "gas impermeable" material/layer is a material with an oxygen transmission rate (OTR) of less than 0.016 $cm^2/m^2/day$ at test conditions of 73° F. with 0% relative humidity using American Society for Testing and Materials (ASTM) standard D-3985. A "moisture impermeable" material/layer means a material with a moisture vapor transmission rate (MVTR) of less than 0.016 grams of water/$m^2$/day at test conditions of 100° F. with 90% relative humidity using ASTM standard F-1249.

Figure 2:
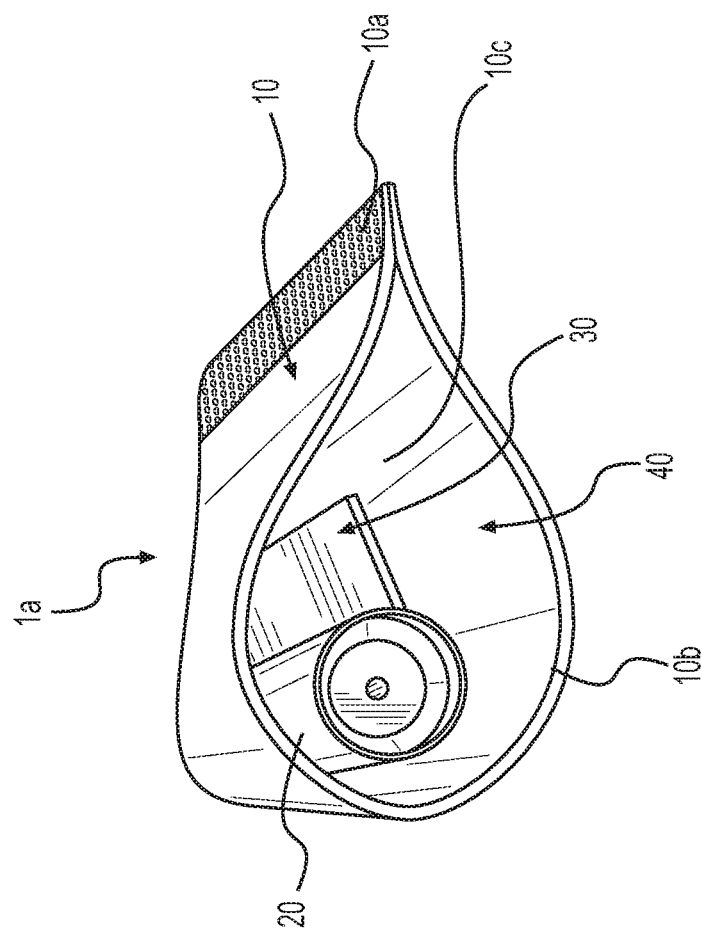
FIG. 2 is an illustration of the pouch of FIG. 1 in a partially sealed configuration, in accordance with an example embodiment.

FIG. 2 is an illustration of a partially sealed pouch 1a, in accordance with an example embodiment. In an example embodiment, the partially sealed pouch 1a is sealed, as shown for instance in the example embodiment of FIG. 3, described below. In the partially sealed pouch 1a configuration, ends of the pouch material 10 may be joined via a crimp (heat seal) 10a, where the pouch material 10 forms an inner cavity 40 with an unsealed end 10b. In an example embodiment, all ends of the partially sealed pouch 1a, besides or in addition to the unsealed ends 10b shown in FIG. 2, are either sealed, as described herein. In an alternative embodiment, ends of the pouch material 10 may be joined by an adhesive, a stitching using a filament, a fiber and/or a thread, folding, and/or other structure in lieu of, or in addition to crimping or heat sealing. In another alternative embodiment, or in addition to the other embodiments, the partially sealed pouch 1a is extruded or blown into a suitable shape, where the unsealed end 10b of the extruded or blown pouch 1a may be sealed by the structure and/or means described herein.

As shown in FIG. 2, the oxygen scavenger 30 may contact the consumable item 20, or alternatively the oxygen scavenger 30 may not contact the consumable item 20, as long as at least a portion of the oxygen scavenger 30 is directly exposed to the inner cavity 40 that also contains the consumable item 20. The oxygen scavenger 30 may be loose within the inner cavity 40, or may, for instance, be adhered and/or melted to an inner surface 10c of the pouch material 10, be adhered and/or melted to an inner surface 10c of an end of the pouch material 10, or the oxygen scavenger 30 may be adhered and/or melted into the crimp (heat seal) 10a.

Figure 3:
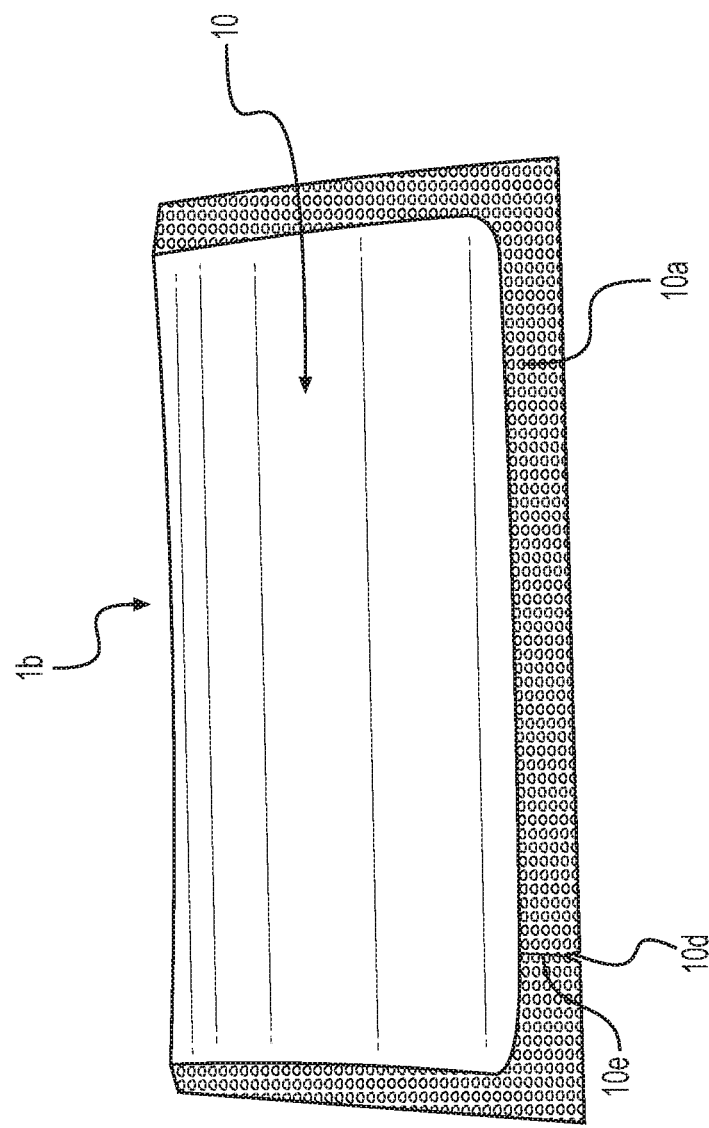
FIG. 3 is an illustration of the pouch of FIG. 1 in a fully sealed configuration, in accordance with an example embodiment.

FIG. 3 is an illustration of a pouch 1b in a fully sealed configuration, in accordance with an example embodiment. In this sealed configuration, or in a similar sealed configuration (based on any of the embodiments of the pouch described herein), the oxygen scavenger 30 may in certain example embodiments, over time, reduce a concentration of free-oxygen (molecular oxygen) within the airspace of the inner cavity 40 of the pouch 1b, thereby effectively creating or approximating a chemically-inert atmosphere within the sealed pouch 1b. In some example embodiments, said atmosphere may be created even in the absence of any process that may remove air and/or oxygen from the sealed pouch 1b, or any process that may replace oxygenated-air with an inert gas, prior to the pouch 1b being sealed. In an alternative embodiment, a process of removing air from the pouch 1b, or substituting oxygenated-air with an inert or semi-inert gas, may be combined with the addition of the oxygen scavenger 30 within the pouch 1b.

In an example embodiment, the crimp 10a of the pouch 1b may have an outer corrugated surface (for example, as illustrated in FIG. 3), and the crimp 10a may define a notch 10d and/or a score line 10e that may allow the pouch 1b to be easily torn open. In another embodiment, or in addition to the notch 10d and/or score line 10e, a marking or indicia may be included on the outer surface of the pouch in order to signify a weakened portion of the pouch 1b that is to be torn open.

Figure 4:
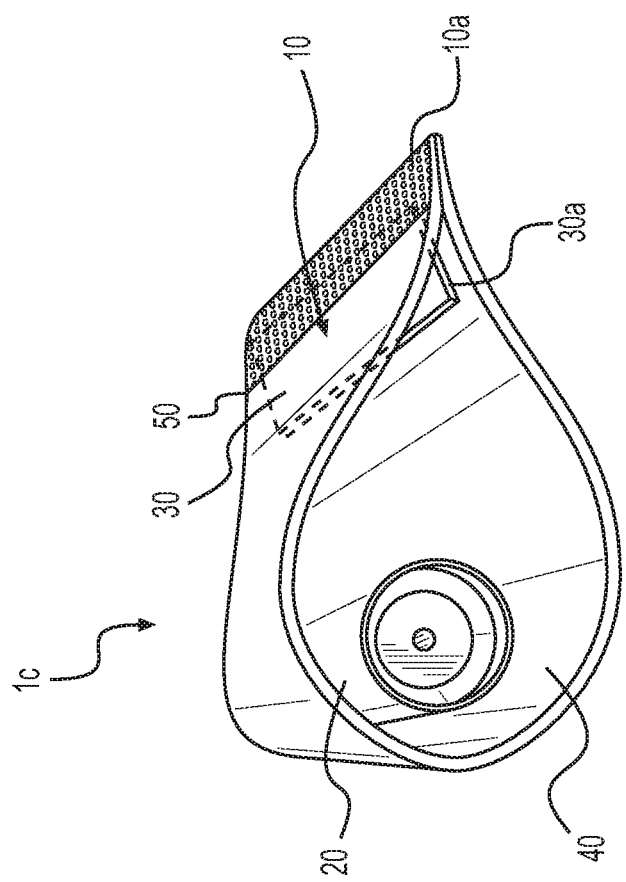
FIG. 4 is an illustration of an oxygen scavenger being sealed within a seam of a pouch, in accordance with an example embodiment.

FIG. 4 is an illustration of an oxygen scavenger 30 being sealed within a seam 50 of a partially-sealed pouch 1c, in accordance with an example embodiment. In an example embodiment, open ends, or all ends of the partially-sealed pouch 1c, are sealed, as described herein. In this embodiment, the oxygen scavenger 30 is at least partially melted and pressed into the crimp (heat seal) 10a, where an exposed end 30a of the oxygen scavenger 30 extends into the inner cavity 40 that contains the consumable item 20. In an alternative embodiment, the oxygen scavenger 30 is captured and/or sewn into the seam 50 of joined ends of the pouch material 10 via the use of an adhesive, a stitching using a filament, a fiber and/or a thread, folding, and/or other structure in lieu of, or in addition to, crimping/heat sealing. In example embodiments, the quantity of the exposed end 30a of the oxygen scavenger 30 is such that the oxygen scavenger 30 is able to remove an expected volumetric quantity of free-oxygen within the inner cavity 40 of the pouch 1b.

Figure 5A:
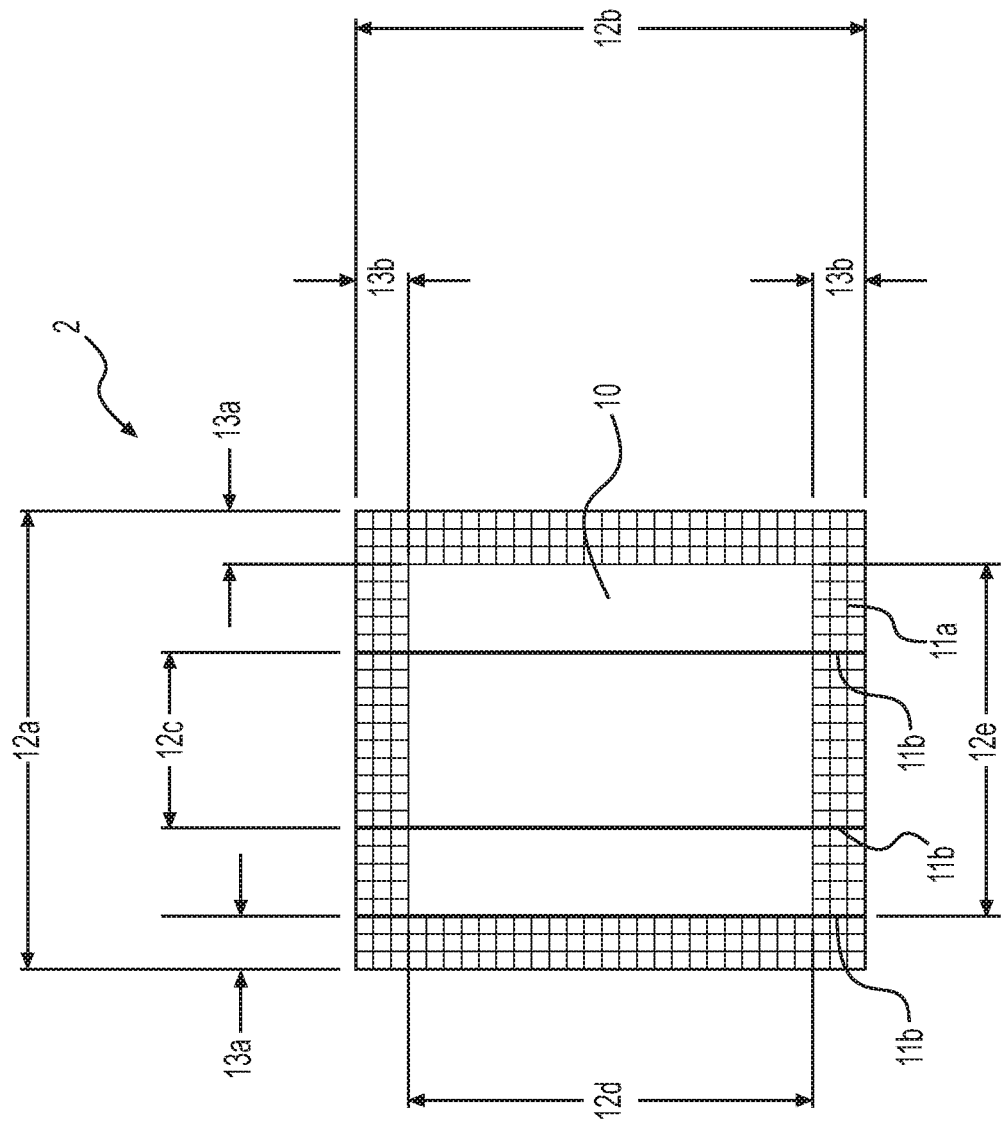
FIG. 5A is a diagram illustrating an unsealed pouch, in accordance with an example embodiment.

FIG. 5A is a diagram illustrating another unsealed pouch 2, in accordance with an example embodiment. The pouch material 10 may include a knurled border 11a, where the knurled border 11a can be crimped to form a sealed pouch 2a (see, e.g., FIGS. 5B and 5D). In some example embodiments, the pouch material 10 may be folded to form the sealed pouch 2a. In some example embodiments, the pouch material 10 may be folded on fold lines 11b to form the sealed pouch 2a, where the fold lines 11b may be visible lines, or the fold lines 11b may not be visible.

In an example embodiment, the pouch material 10 may be rectangular in shape, and an overall length 12b of the pouch material 10 may be about 88 mm and an overall width 12a may be about 78 mm. Once the pouch material 10 is folded, the width 12c of the folded and sealed pouch 2b may be about 30 mm. The knurled border 11a on the side-ends of the pouch material 10 may have a width 13a of about 9 mm, where these side-ends may be joined via crimping to form a "fin seal" 2c (see, e.g., FIGS. 5D and 6B). The knurled border 11a on the top and bottom of the pouch material 10 may have a width 13b of about 8.375 mm. A useable interior width 12e and length 12d of the pouch material 10 (the non-knurled portion of the pouch material) may be about 60 mm and 71.25 mm, respectively. Any other dimensions or shapes for the pouch may be used, for example, depending on the items or items to be stored within the pouch.

In an example embodiment, the border 11a of the pouch material 10 is made from a material that can be joined and/or crimped, where the border 11a is optionally non-knurled.

Figure 5B:
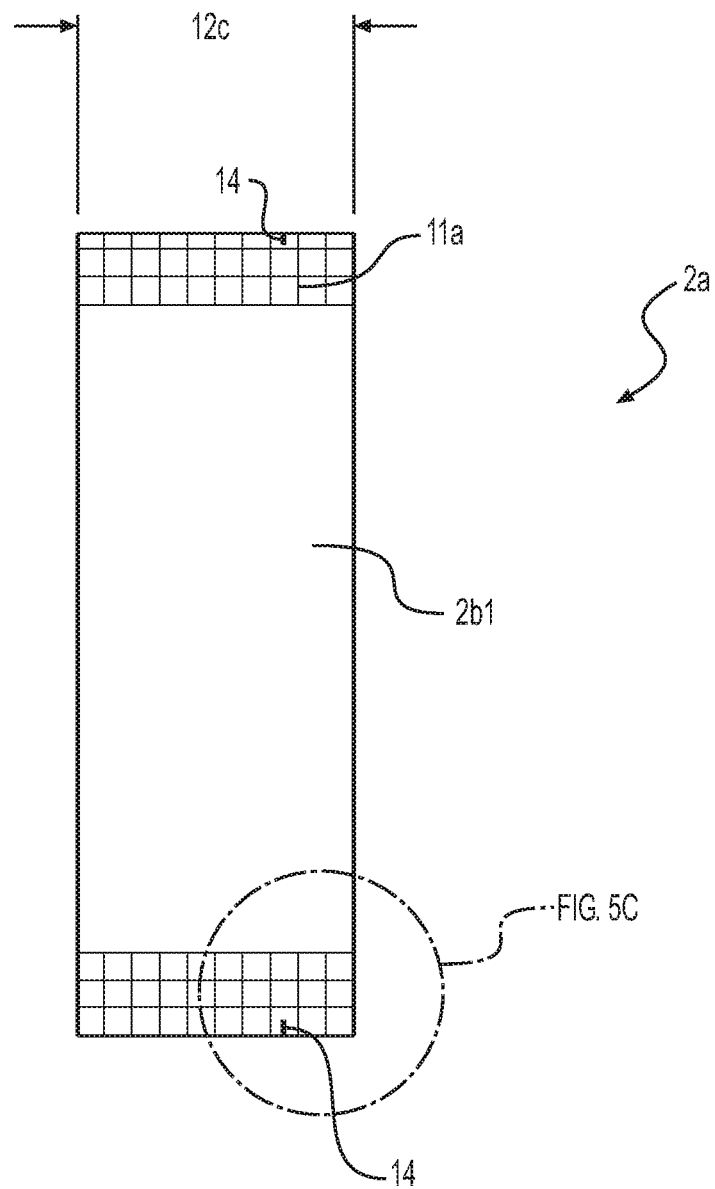
FIG. 5B is a diagram illustrating a front view of the pouch of FIG. 5A in a sealed configuration, in accordance with an example embodiment.

FIG. 5B is a diagram illustrating a front 2b1 of a sealed pouch 2a made from the unsealed pouch 2 of FIG. 5A, in accordance with an example embodiment. The sealed pouch 2a can be formed from crimping (heat sealing) ends of the pouch material 10 together along the knurled area 11a. In an example embodiment, at least one portion of the knurled area 11a may include a non-knurled area 14 (see FIG. 5C) that may facilitate tearing and opening of the pouch 2a. In some example embodiments, non-knurled area 14 may be included at a bottom end and at a top end of the pouch, as shown in 5B, some embodiments may only include non-knurled area 14 in one end of the pouch (see, e.g., FIG. 6A), and some examples may not include such area 14.

Figure 5C:
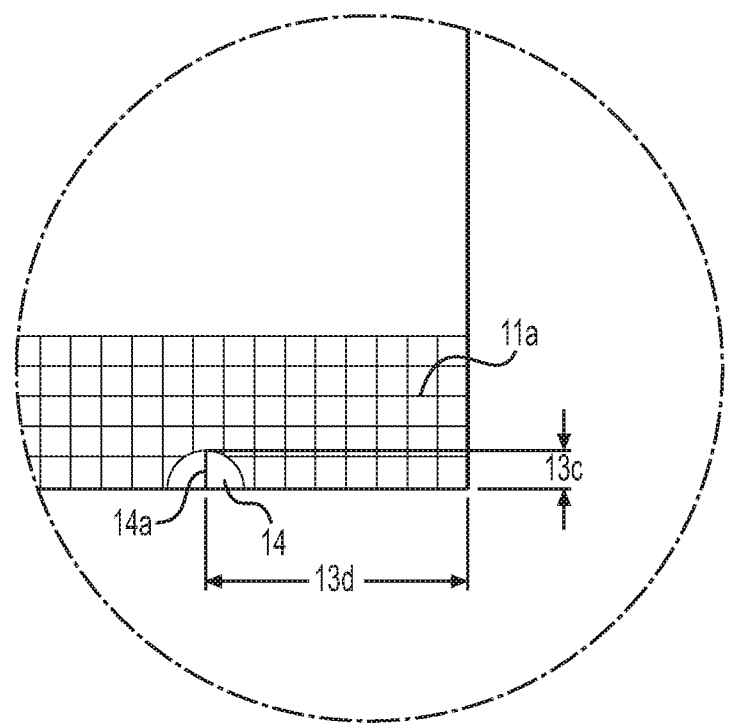
FIG. 5C is a diagram illustrating a tear open cut on at least one end of the sealed pouch of FIG. 5B, in accordance with an example embodiment.

FIG. 5C is a diagram illustrating the non-knurled area 14 of FIG. 5B, in accordance with an example embodiment. The non-knurled area 14 may be used to weaken the crimped/knurled 11a portion of the pouch 2a to make the pouch 2a easier to tear and open in this area 14. The non-knurled area may optionally include a score line 14a to further allow for easy tearing. In an example embodiment, a notch or indention (not shown) may be included in lieu of, or in addition to, the score line 14a. In another embodiment, a score line, notch, indention and/or other weakened area formed in the knurled area 11a (as opposed to being formed in a non-knurled area 14) can be used to facilitate tearing and opening. In yet another embodiment, other structure may be used to weaken a portion of the pouch 2a to facilitate tearing and/or opening, where the other structure can include any combination of notches, indentations, score lines, dissimilar materials, non-knurled areas, etc.

Figure 5D:
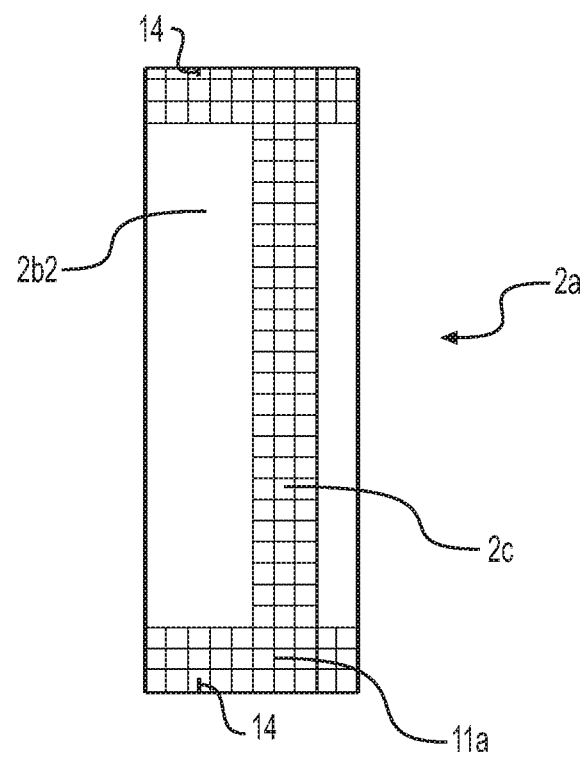
FIG. 5D is a diagram illustrating a rear view of the sealed pouch of FIG. 5B, in accordance with an example embodiment.

FIG. 5D is a diagram illustrating a rear 2b2 of the sealed pouch 2a of FIG. 5B, in accordance with an example embodiment. In an example embodiment, the rear 2b2 of the pouch 2a can include a "fin seal" 2c (also shown in 6B) formed via the crimping/joining of ends of the pouch material 10, where the fin seal 2c extends away from the sealed pouch 2a but may be folded to lay along the rear 2b2 of the pouch 2a.

In an example embodiment, the pouch material 10 is made from a material that facilitates tearing and opening. In some embodiments, the fin seal 2c can facilitate tearing and opening of the pouch 2a, where the fin seal 2c is manually pulled to cause tearing to occur along a base of the fin seal 2c to facilitate opening of the pouch 2a, with or without a weakened area.

In an example embodiment, a weakened area (not shown) is included at the base of the fin seal 2c, thereby facilitating the opening of the pouch 2a by manually pulling the fin seal 2c.

Figure 6A:
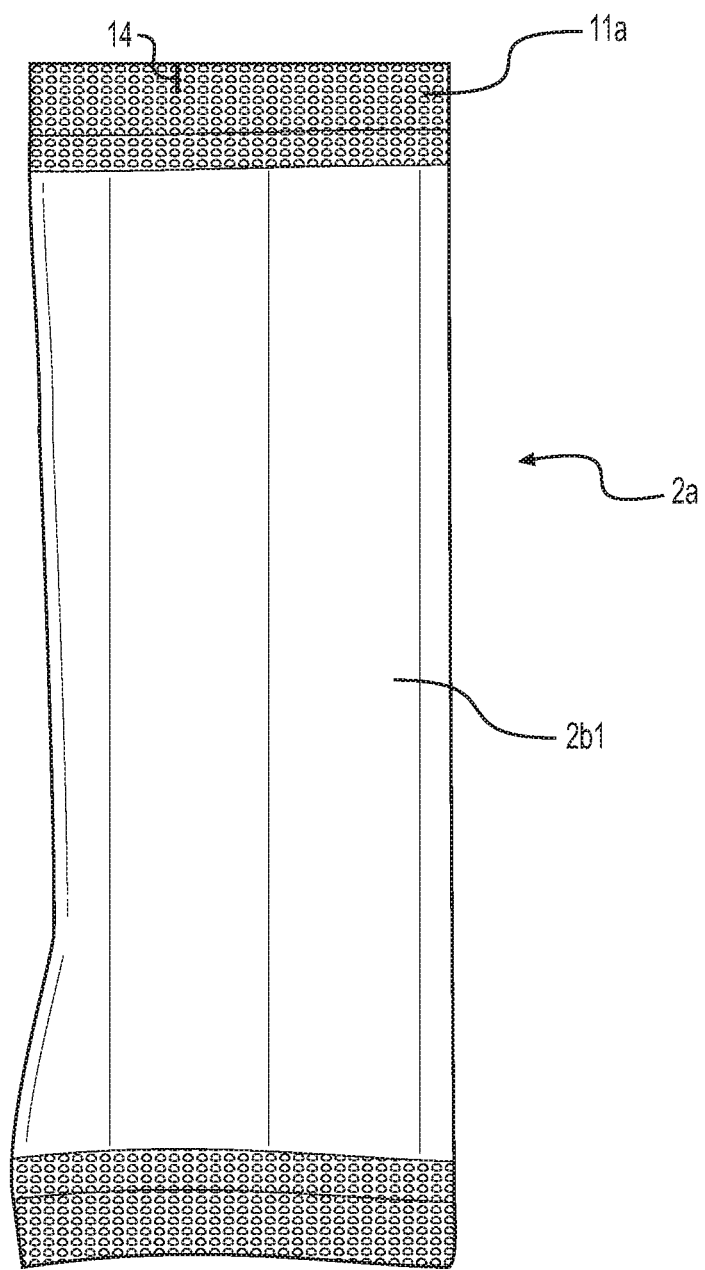
FIG. 6A is an illustration of a front view of a sealed pouch, in accordance with an example embodiment.
Figure 6B:
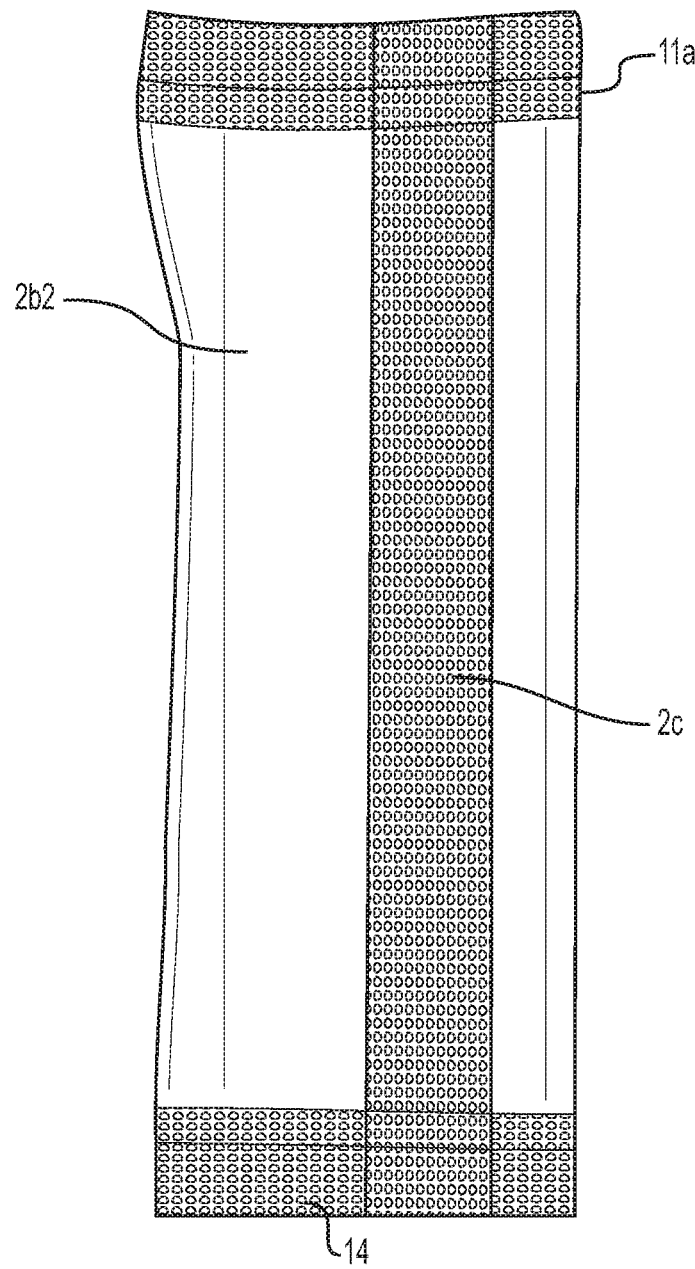
FIG. 6B is an illustration of a rear view of the sealed pouch of FIG. 6A, in accordance with an example embodiment.

FIG. 6A is an illustration of the front 2b1 of a sealed pouch 2a, in accordance with an example embodiment, including a consumable item 20 and oxygen scavenger 30. FIG. 6B is an illustration of a rear 2b2 of the sealed pouch 2a of FIG. 6A, in accordance with an example embodiment. This view depicts a "fin seal" 2c along the rear 2b2 of the pouch 2a.

Figure 7:
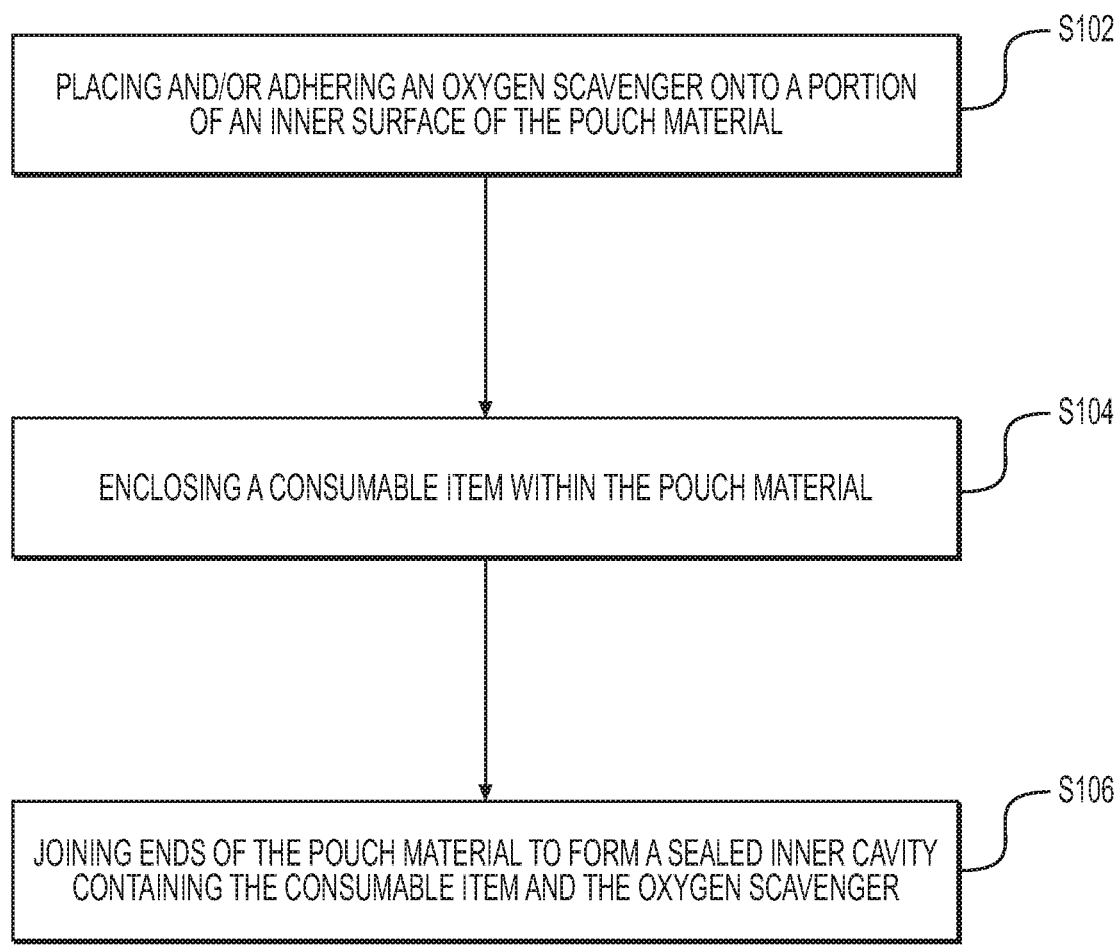
FIG. 7 is a flowchart detailing a method of making a pouch with an oxygen scavenger, in accordance with an example embodiment.

FIG. 7 is a flowchart detailing a method of making a sealed pouch 1b with an oxygen scavenger 30, in accordance with an example embodiment. In step S102, the oxygen scavenger 30 is adhered to at least a portion of an inner surface 10c of the pouch material 10. In some examples, the pouch material 10 is gas/moisture impermeable. In an example embodiment, this step is performed through a combined application of heat and pressure to ensure that the oxygen scavenger 30 forms a bond with the inner surface 10c of the pouch material 10. Alternatively, or in addition to the application of heat and pressure, the oxygen scavenger 30 may be adhered to the pouch material 10 via sewing, stitching, an application of an adhesive and/or other structure that may be used to affix the oxygen scavenger 30 to the pouch material 10. In some example embodiments, the oxygen scavenger 30 may simply be placed in an inner surface of the pouch material without adhering the oxygen scavenger 30 to said surface.

In another embodiment, the adhering of the oxygen scavenger to the inner surface 10c of the pouch material 10 (step S102) is accomplished during the providing of the pouch material 10 (step S100). In particular, during the formation of the pouch material 10, the oxygen scavenger 30, or elements of the oxygen scavenger 30, may be infused into some or all of the inner surface 10c of the pouch material 10. Or, the oxygen scavenger 30 may be the inner surface 10c of the pouch material 10, or elements of the oxygen scavenger 30 may comprise at least a portion of the inner surface 10c of the pouch material 10. In an example embodiment, the inner surface 10c of the pouch material 10 is made from a material that allows for oxygen migration through the inner surface 10c.

In an example embodiment, a light-sensitive activator, such as a photo-initiator or photo-activator, is included in the oxygen scavenger 30 and/or co-mingled with the elements of the oxygen scavenger 30. In an example embodiment, the light-sensitive activator includes molecules that, when exposed to a light source, will create a free-radical that binds with free-oxygen in a reduction reaction, so that the free-oxygen will in turn bind with the elements of the oxygen scavenger to initiate (activate) a further reaction between the oxygen scavenger and additional free-oxygen, as described below in more detail. In an example embodiment, the oxygen scavenger 30, or elements of the oxygen scavenger 30, and the light-sensitive activator, are infused into the inner surface 10c of the pouch material 10. In some embodiments that involve the light-sensitive activator, the oxygen scavenger 30 containing the light-sensitive activator, or the inner surface 10c of the pouch material 10 containing the elements of the oxygen scavenger 30 and the light-sensitive activator, can be shielded from the light source prior to the complete formation of the sealed pouch 1b (in step S106, described below). This may be accomplished by keeping the oxygen scavenger 30 and/or inner surface 10c covered, stored in a roll or stored in a light-depleted environment to ensure that the light-sensitive activator is not exposed to a light source that would otherwise inadvertently initiate the reaction between the light-sensitive activator and free-oxygen prior to the formation of the sealed pouch 1b.

In an example embodiment, a light-sensitive activator initiates a reaction with free-oxygen by being exposed to a light source that is ultraviolet (UV) light. In another embodiment, a light-sensitive activator initiates a reaction with free-oxygen by being exposed to a light source that is visible light, or portions of the spectrum of visible light. In some embodiments, a light-sensitive activator that is a part of the oxygen scavenger 30, or co-mingled with the elements of the oxygen scavenger 30 (either in an oxygen scavenger 30 material, or infused within the inner surface 10c of the pouch material 10), is exposed to the light source prior to either step S104 or step S106, described below.

In step S104, the consumable item 20 is enclosed within at least a portion of the pouch material 10. In some example embodiments, this may occur while the pouch is in a partially-sealed 1a/1c configuration.

In step S106, ends of the pouch material 10 are joined to form a sealed inner cavity 40 that contains the consumable item 20. The joining of the pouch material 10 may be accomplished through crimping (heat sealing), where a combined application of heat and pressure is used to form the crimp 10a. In an example embodiment, the crimping is accomplished using an applied pressure of about 20-40 psi (138-276 kPa) for a duration of less than 1 minute, with an applied temperature of about 137-205° C. In another embodiment, crimping is accomplished using an applied pressure of about 30 psi (207 kPa) with an applied temperature of about 137-205° C., or about 170° C. Other crimping pressures may be used. The joining of the pouch material 10 may also be accomplished through the use of an adhesive, a stitching using a filament, a fiber and/or a thread, folding, and/or other structure in lieu of, or in addition to crimping. In an example embodiment, the steps S102/S106 are accomplished in a same one step, where the oxygen scavenger 30 may be partially sealed within a seam 50 of joined pouch material 10 through the use of crimping, sewing, stitching, adhesive bonding, folding, etc. In the event that the oxygen scavenger 30 is partially sealed within the seam 50 of the sealed pouch 1b, in some example embodiments an exposed end 30a of the oxygen scavenger 30 extends into the inner cavity 40 containing the consumable item 20 so that a quantity of the exposed end 30a will remove an expected volumetric quantity of oxygen within the inner cavity 40.

Oxygen Scavenger Composition & Physical Properties According to Some Example Embodiments In an example embodiment, an oxygen scavenger 30 may include iron fragments mixed within a matrix to form a strip.

In this embodiment, the iron fragments may be evenly and/or homogenously mixed within the matrix. In an example embodiment, the matrix of the oxygen scavenger 30 is made from a material that allows oxygen migration/diffusion through the oxygen scavenger 30, where the materials for the matrix, described herein, allow for such migration/diffusion. In an example embodiment, the matrix is a polymer matrix (polymer material) or a thermoplastic. In another embodiment, the matrix is made from polyethylene. In an example embodiment, the polymer material of the matrix of the oxygen scavenger 30 has a melting point temperature that is similar, or the same, as the melting point temperature of the inner surface 10c of the pouch 1. In an example embodiment, the difference in melting point temperature between the inner surface 10c of the pouch 1 and the polymer material of the matrix of the oxygen scavenger 30 is about 25° C. or less, or about 10° C. or less, or about 5° C. or less. In an example embodiment, the polymer material of the matrix of the oxygen scavenger 30 is a same material as the material that forms the inner surface 10c of the pouch 1. In an example embodiment, the melting point temperature of the polymer material of the matrix is lower than a melting point temperature of a gas/moisture impermeable layer of the pouch, and lower than a melting point temperature of layers of the pouch material 10 that are not the inner surface 10c of the pouch material 10. In example embodiments, the iron fragments in the oxygen scavenger 30 remove free-oxygen by binding with available free-oxygen via an iron oxidation reaction. The iron oxidation reaction, in essence, causes the iron fragments to rust. In example embodiments, the quantity of iron fragments in the oxygen scavenger 30 is such that the iron fragments will bind with an expected quantity of oxygen in the sealed pouch 1b.

In an example embodiment, a light-sensitive activator, such as a photo-initiator or photo-activator, is included in the oxygen scavenger 30 and/or co-mingled with active elements of the oxygen scavenger 30. In example embodiments, active elements of the oxygen scavenger include elements that bind with free-oxygen, where these active elements may include the iron fragments. In an example embodiment, the light-sensitive activator includes molecules that, when exposed to light, will create a free-radical that binds with free-oxygen in a reduction reaction, so that the free-oxygen will in turn bind with the elements of the oxygen scavenger 30 to initiate (activate) a further reaction between the oxygen scavenger 30 and additional free-oxygen. In an example embodiment, the oxygen scavenger 30, or elements of the oxygen scavenger 30, and the light-sensitive activator, are infused into the inner surface 10c of the pouch material 10, and the inner surface 10c is made from a material that allows oxygen migration.

An oxygenation reaction involving the light-sensitive activator is shown below, according to an example embodiment. An activator (A) can be any known light-sensitive activator that produces a free-radical in the presence of light. Equation 1 is initiated by the activator being exposed to light (L). In these example reactions, the free-radical (.) includes a single unpaired electron.

$$A\text{-}L \rightarrow A. \qquad \text{Eq. 1}$$

$$2A. + O_2 \rightarrow 2A^+ + 2O^-. \qquad \text{Eq. 2}$$

$$2Fe^{+2} + 3(O^-.) \rightarrow Fe_2O_3 \qquad \text{Eq. 3}$$

In an example embodiment, the light-sensitive activator is a uni-molecular free-radical generating photo-initiator that may be a peroxide, a benzophenone derivative, a benzoyl derivative, anthrone or xanthone. In an example embodiment, the light-sensitive activator is a uni-molecular free-radical generating photo-initiator that undergoes homolytic cleavage to produce the free-radical. In an example embodiment, the light-sensitive activator is a combination of two or more of these example activators.

In an example embodiment, the oxygen scavenger 30, or the inner surface 10c of the pouch material 10 that is or includes the oxygen scavenger, is perforated, or a surface of the oxygen scavenger 30 is wavy, textured, lenticular, or otherwise non-smooth, in order to increase an overall surface area of the oxygen scavenger 30 and/or inner surface 10c.

Pouch Material According to Some Example Embodiments

Figure 8:
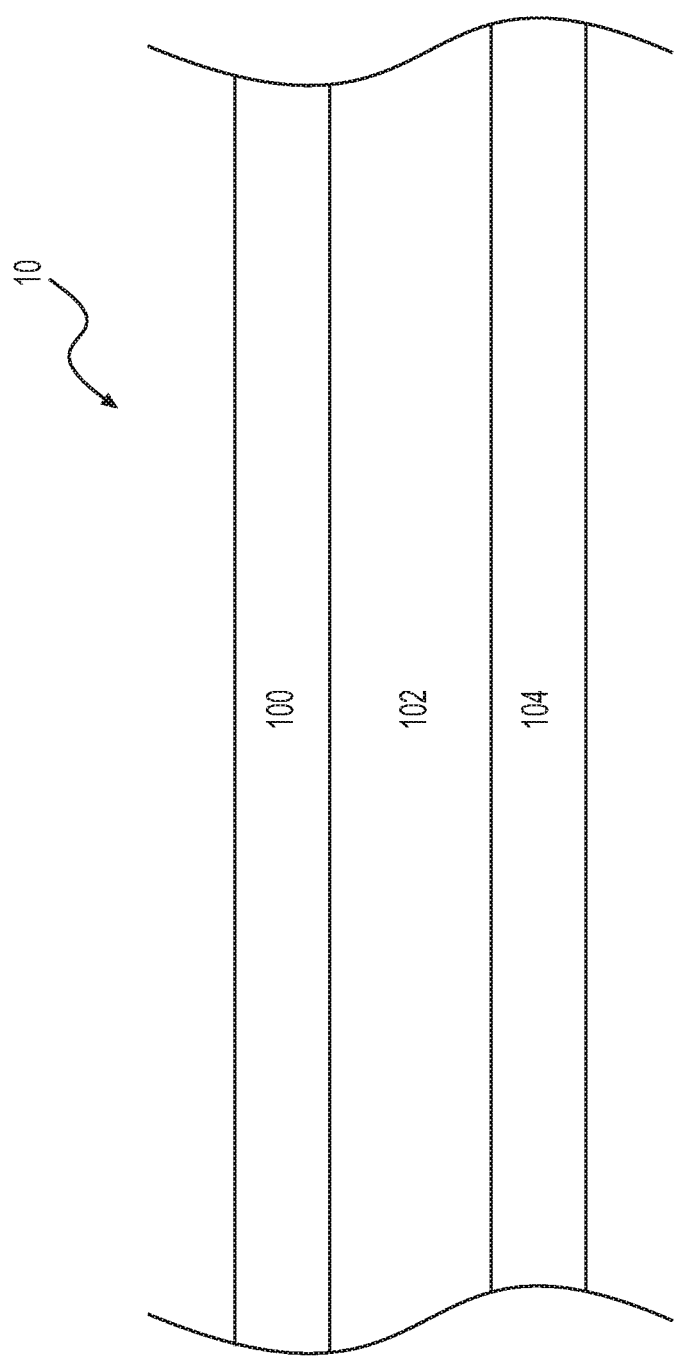
FIG. 8 is an illustration of a cross-section of a pouch material, in accordance with an example embodiment.

FIG. 8 is an illustration of a cross-section of a pouch material 10, in accordance with an example embodiment. In the example embodiment, the pouch material 10 is gas and moisture impermeable, and the pouch material 10 is a multi-layer structure that includes a gas/moisture impermeable layer 102 bracketed by low melting point polymer layers 100/104. In an example embodiment, the gas/moisture impermeable layer 102 is a foil layer that includes a foil, a foil laminate, a composite material with at least one foil layer, an aluminum layer, an aluminum alloy layer, a pliable metalized film layer, or a combination of one or more of these. In an alternative embodiment, the gas/moisture impermeable layer 102 is a polymer that includes an elastomer, plastic, vinyl, rubber, butyl rubber, polyethylene, ethylene vinyl alcohol (EVOH), or a composite of any of these materials, or a composite of pliable or semi-pliable polymer materials that are gas and moisture impermeable.

In an example embodiment, the polymer layers 100/104 are made from a relatively low melting point polymer, relative to the gas/moisture impermeable layer 102, where each layer 100/104 may be a same polymer material, or a different polymer material. In an example embodiment, the polymer layers 100/104 include biaxially-oriented polyethylene terephthalate (BOPET), polyethylene (PE), polypropylene, other similar low-melting point polymers or thermoplastics, or combinations thereof. The polymer layers 100/104 may, for instance, include a layer or layers of elastomers, plastics, or other pliable polymer layers that have a relatively low melting point, or combinations of these materials. In using the pouch material 10 to make the sealed pouch 1b (using the method of FIG. 7), the oxygen scavenger 30 can be connected to or in contact with one of the polymer layers 100/104, once the ends of the pouch material 10 are joined to seal the pouch 1b. In an example embodiment, the polymer layers 100/104 are made from a material that allows oxygen migration/diffusion through the layers 100/104.

In an example embodiment, the oxygen scavenger 30 is one or both of the polymer layers 100/104. In another embodiment, active elements of the oxygen scavenger 30 (e.g., iron fragments) are infused into at least one of the polymer layers 100/104. In an example embodiment, a light-sensitive activator is also co-mingled or infused with active elements of the oxygen scavenger 30 into at least one of the polymer layers 100/104. In an example embodiment, active elements of the oxygen scavenger 30 and a light-sensitive activator are homogenously mixed together within one or both of the polymer layers 100/104.

An example embodiment pouch material 10 that includes a gas/moisture impermeable layer 102, with outer low melting point polymer layers 100/104, can provide a pliable or semi-pliable pouch material 10 that is easy to work with, is impervious to oxygen/gas exchange, and/or can be conveniently joined and/or crimped (heat sealed) using low temperature heating. However, in an alternative embodiment, the pouch material 10 is a single layer material, where the single layer is a gas/moisture impermeable layer. In another embodiment, the pouch material 10 is a multi-layer material, where each of the layers is a gas/moisture impermeable layer. In an example embodiment, the pouch material 10 is devoid of polymer layers, or devoid of low melting point outer layers.

Figure 9:
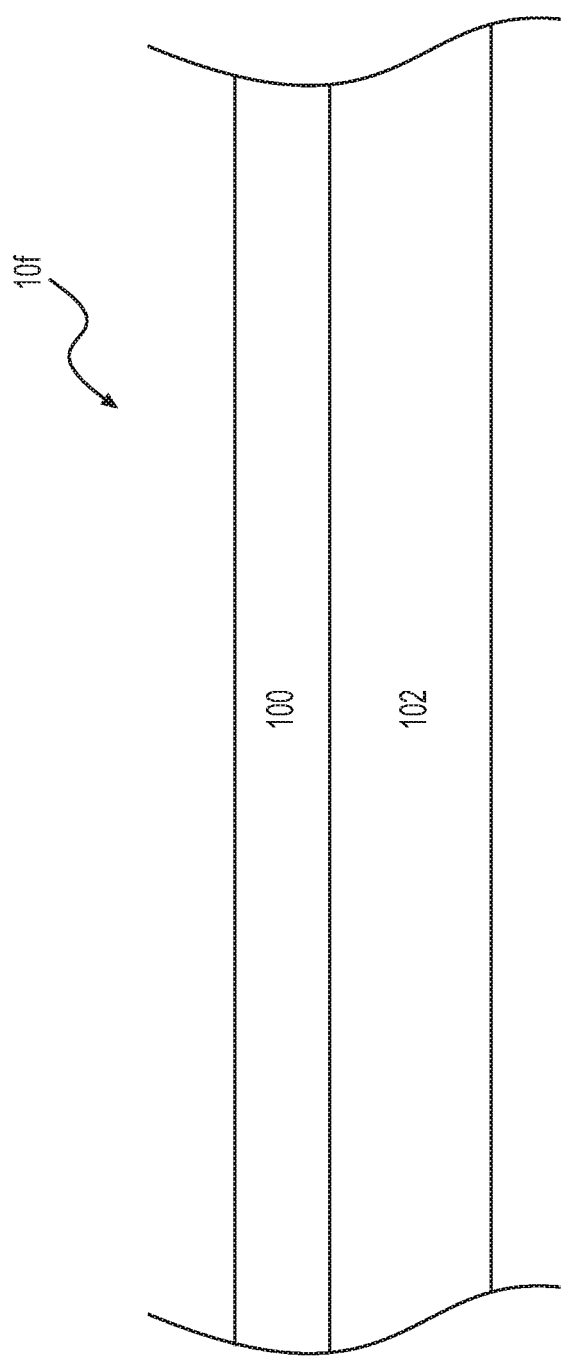
FIG. 9 is an illustration of a cross-section of another pouch material, in accordance with an example embodiment.

FIG. 9 is an illustration of a cross-section of another pouch material 10f, in accordance with an example embodiment. In an example embodiment, the pouch material 10f is a multi-layer material that includes a polymer layer 100 and a gas/moisture impermeable layer 102. In this embodiment, the pouch material 10f can be joined at the ends to form a pouch in a same manner as described above in relation to FIG. 2, where the joining of the ends of the material involves joining the polymer layers 100 together. That is to say, the pouch is assembled so that the polymer layer 100 forms an interior of the pouch and the gas/moisture impermeable layer 102 forms an exterior surface of the pouch, where the oxygen scavenger 30 is connected to or in contact with the polymer layer 100. In an example embodiment, crimping is used to heat and press ends of the polymer layer 100 together to join ends of the pouch material 10f to form the pouch. In another embodiment, other methods of joining ends of the pouch material 10f together is used to form the pouch, where the other methods may include the use of an adhesive, a stitching using a filament, a fiber and/or a thread, folding, extruding, blowing and/or other structure in lieu of, or in addition to crimping. The polymer layer 100 has a lower melting point temperature relative to the gas/moisture impermeable layer 102. In an example embodiment, the polymer layer 100 is made from a material that allows oxygen migration/diffusion through the layer 100, where the materials for the layer 100 listed above allow for such migration/diffusion.

In an example embodiment, the oxygen scavenger 30 is the polymer layer 100, or is part of the polymer layer 100. In an example embodiment, active elements of the oxygen scavenger 30 (e.g., iron fragments) are infused into the polymer layer 100, where a light-sensitive activator may also be co-mingled or infused with the active elements of the oxygen scavenger 30 into the polymer layer 100. In an example embodiment, active elements of the oxygen scavenger 30 and a light-sensitive activator are homogenously mixed together within the polymer layer 100.

Figure 10:
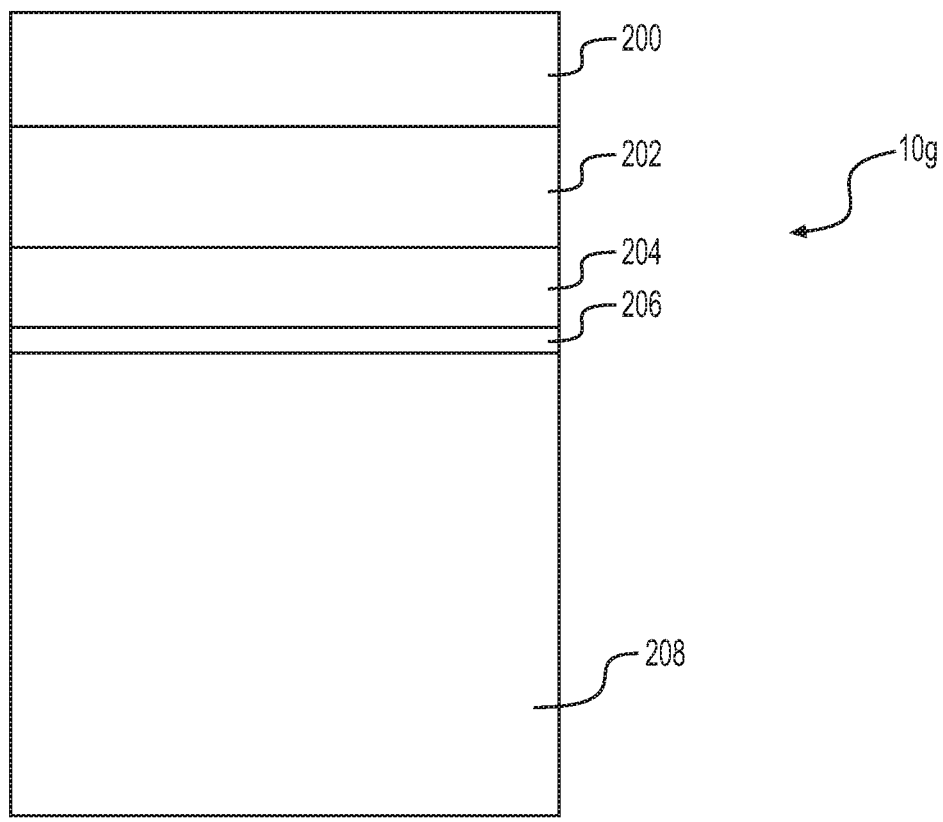
FIG. 10 is an illustration of a cross-section of another pouch material, in accordance with an example embodiment.

FIG. 10 is an illustration of a cross-section of another pouch material 10g, in accordance with an example embodiment. In an example embodiment, the gas/moisture impermeable portion of the pouch material 10g includes several layers that include: a biaxially-oriented polyethylene terephthalate (BOPET) layer 200, a polyethylene layer (that may be a clear or translucent polyethylene, or PE) 202 and a foil layer 204. In an example embodiment, the pouch material 10g also includes an adhesive layer 206 and a sealant layer 208. The sealant 208 may be a polyethylene-based sealant, a polyethylene terephthalate (PET)-based sealant, a resin-based sealant, or combinations of these. In an example embodiment, the resin-based sealant is an ionomer resin sealant, such as a Surlyn® sealant, where Surlyn® is a registered trademark of DowDuPont Inc. In an example embodiment, the sealant layer 208 is a TOPAS® cyclic olefin copolymer (COC) resin sealant, such as a CXB® sealant, where TOPAS® and CXB® are registered trademarks of Bemis Company, Inc. In an example embodiment, the sealant layer 208 is connected to the foil layer 204 by the adhesive layer 206. The sealant layer 208 of an example embodiment has a lower melting point relative to the gas/moisture impermeable layers (layers 200, 202 and 204). In an example embodiment, the sealant layer 208 is made from a material that allows oxygen migration/diffusion through the sealant layer 208, where the materials for the sealant layer 208 listed above allow for such migration/diffusion.

In an example embodiment, adhesive 206 may be a silicone-based adhesive, a food-grade polymer, a food-grade epoxy, combinations of these materials, or other suitable adhesives used for the storage of food-grade and/or consumable items.

In an example embodiment, a pouch material 10g includes the following layers listed with respective thicknesses: 12 microns of BOPET layer 200, 13 microns of PE layer 202, 8.9 microns of foil layer 204, 2.0 microns of the adhesive layer 206 and 50.8 microns of sealant layer 208.

A pouch material 10g may be used to form a pouch in a manner that is the same as that described in relation to FIGS. 2, 8 and 9, according to example embodiments. In an example embodiment, in order to join ends of the pouch material 10g together, the sealant layer 208 portion of the pouch material 10g is joined, causing the sealant layer 208 to form an interior surface of the assembled pouch and the gas/moisture impermeable layer to form an exterior surface of the assembled pouch. Therefore, the oxygen scavenger 30 is connected or contacting the sealant layer 208 once the sealed pouch 1b is formed from the pouch material 10g. In an example embodiment, the exterior surface of the assembled pouch is the BPOET layer 200.

In an example embodiment, the oxygen scavenger 30 is the sealant layer 208 or is part of the sealant layer 208. In an example embodiment, active elements of the oxygen scavenger 30 (e.g., iron fragments) are infused into the sealant layer 208, where a light-sensitive activator may also be co-mingled or infused with active elements of the oxygen scavenger 30 into the sealant layer 208. In an example embodiment, active elements of the oxygen scavenger 30 and a light-sensitive activator are homogenously mixed together within the sealant layer 208.

Figure 11:
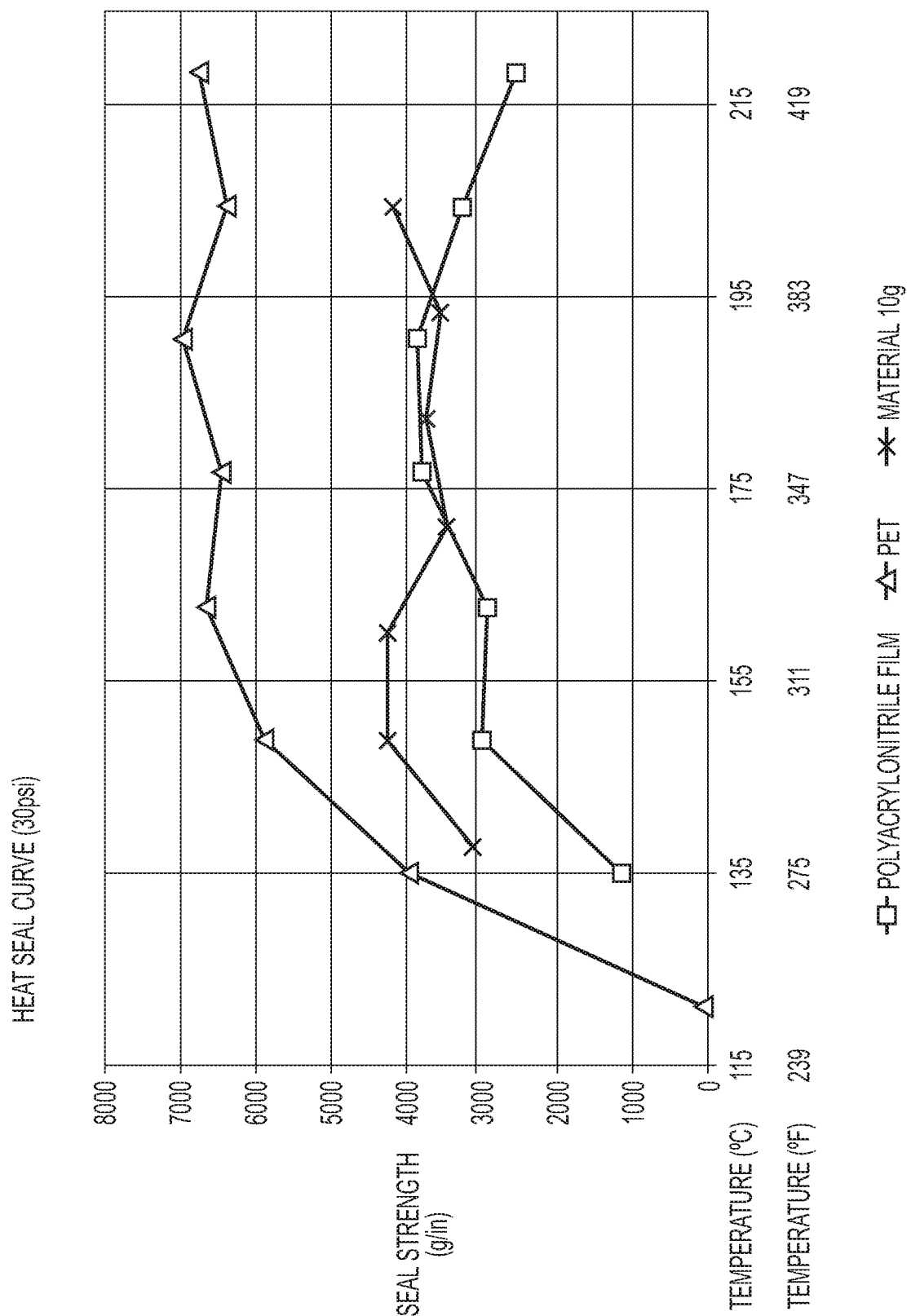
FIG. 11 is a chart illustrating a heat sealing curve for a pouch material, in accordance with an example embodiment.

FIG. 11 is a chart illustrating a heat sealing (crimping) curve for a pouch material 10g, in accordance with an example embodiment. In an example embodiment, heat sealing is accomplished to join ends of the pouch material to form and/or seal a pouch. As shown in FIG. 11, in an example embodiment, a pouch material 10g provides a consistent and stable seal strength (in a range of about 3,000-4,250 g/in) for joined ends of the pouch material 10g, using a relatively wide range of heat sealing temperatures that are in a range of about 137-205° C. This temperature range includes an applied temperature for heating and pressing ends of the pouch material 10g together to form and/or seal a pouch, where the heat sealing is accomplished using an applied pressure of about 30 psi (207 kPa).

In an example embodiment, heat sealing of the pouch materials of example embodiments is accomplished using an applied pressure of about 20-40 psi (138-276 kPa) with an applied temperature of about 137-205° C. In another embodiment, heat sealing of the pouch materials of example embodiments is accomplished using an applied pressure of about 30 psi (207 kPa) with an applied temperature of about 137-205° C., or about 170° C.

In an example embodiment, a duration of time required to apply heat and pressure for heat sealing may be less than 1 minute. It should be understood that the applied temperature, pressure and duration of time for performing heat sealing can be dependent on a melting point temperature of the pouch material, and in particular the melting point temperature of the immediate surfaces that are being directly joined to each other during the heat sealing.

Oxygen Scavenger Performance According to Some Example Embodiments

An oxygen scavenger of certain example embodiments reduces a concentration of oxygen within the sealed pouch, in order to mitigate oxidation of a consumable item with the pouch, and/or in order to mitigate unwanted chemical reactions to a flavor system of the consumable item. As an example, using an oxygen scavenger strip in a sealed gas/moisture impermeable pouch with an inner cavity initially containing 2.5 ml of ambient air (where oxygen comprises about 21% of this initial volume), an oxygen scavenger of an example embodiment is able to reduce the oxygen concentration from about 21% down to less than about 0.1% within an initial period of approximately 17 days, where the oxygen concentration may continue to decline further following the initial 17 day period. In some example embodiments, an oxygen scavenger is capable of reducing oxygen levels to 2% or below.

In example embodiments, the rate of oxygen reduction has a bearing on the effectiveness of the oxygen scavenger in preserving a flavor system for a consumable item in a sealed pouch. In an example embodiment, the oxygen scavenger reduces ambient air down to oxygen levels of 2% or less within about 17 days. In an example embodiment, the oxygen scavenger reduces ambient air down to oxygen levels of 1% or less within at least 30 days.

In an example embodiment, an oxygen scavenger 30 is a strip including iron fragments in a polyethylene matrix, where the strip is about 0.3 mm×35 mm×8 mm in size, and the strip is placed in the inner cavity 40 of the sealed pouch 1b. In this embodiment, the oxygen scavenger 30 strip constitutes about 3% of the overall volume of the inner cavity 40. In another embodiment, the same oxygen scavenger strip may constitute about 1% to 4%, or about 1.5% to 3.5%, or about 1.5% of the overall volume of the inner cavity 40. In some example embodiments, the oxygen scavenger 30 reduces the oxygen level of ambient air to a steady-state level of negligible oxygen (less than 0.1% oxygen). In an example embodiment, the oxygen scavenger 30 includes about 4 mg to 8 mg of iron fragments that is to be used in a sealed pouch 1b that initially contains 5.8 ml of ambient air at room temperature.

In some example embodiments, test data for an oxygen scavenger within a gas/moisture impermeable pouch, where a consumable item is an e-vaping cartridge, has shown a reduction in chemical indicators of degradation of the flavor system of the cartridge, with an improved performance of the cartridge. Examples of chemical indicators of flavor system degradation include the formation of the following chemical compositions within a flavor system: formaldehyde, acetaldehyde, nicotine oxide, cotinine, myosmine, and/or nornicotine. Tabulated test data for these chemical indicators for an example embodiment, taken at 24° C. and 60% relative humidity, is included below. The oxygen scavenger in these tests included a scavenger of iron fragments in a polyethylene matrix, where the oxygen scavenger was a strip with dimensions of about 0.3 mm×35 mm×8 mm, where the inner cavity (headspace) of the pouch included about 5.8 ml of ambient air. A control group involving a cartridge in a gas/moisture impermeable pouch, without the existence of an oxygen scavenger strip, was used in these tests.

| Sample | Duration | Avg Formaldehyde μg/g | Std. Dev. |
|---|---|---|---|
| Flavor | 3 mo. | — | — |
| Formulation | 9 mo. | 0.15672 | 0.08632 |
| (no strip) | 12 mo. | 0.12420 | 0.02002 |
| Flavor | 3 mo. | — | — |
| Formulation | 9 mo. | 0.11446 | 0.07428 |
| (with strip) | 12 mo. | 0.10122 | 0.06061 |

| Sample | Duration | Avg Acetaldehyde μg/g | Std. Dev. |
|---|---|---|---|
| Flavor | 3 mo. | — | — |
| Formulation | 9 mo. | 0.10932 | 0.01711 |
| (no strip) | 12 mo. | 0.08270 | 0.02354 |
| Flavor | 3 mo. | — | — |
| Formulation | 9 mo. | 0.08934 | 0.03929 |
| (with strip) | 12 mo. | 0.06968 | 0.01916 |

| Sample | Duration | Avg Nicotine Oxide μg/g | Std. Dev. |
|---|---|---|---|
| Flavor | 3 mo. | 0.16433 | 0.00850 |
| Formulation | 9 mo. | 0.31367 | 0.03516 |
| (no strip) | 12 mo. | 0.44833 | 0.13502 |
| Flavor | 3 mo. | 0.03433 | 0.00404 |
| Formulation | 9 mo. | 0.03133 | 0.01250 |
| (with strip) | 12 mo. | 0.02100 | 0.00900 |

| Sample | Duration | Avg Cotinine μg/g | Std. Dev. |
|---|---|---|---|
| Flavor | 3 mo. | 0.01767 | 0.00058 |
| Formulation | 9 mo. | 0.01967 | 0.00058 |
| (no strip) | 12 mo. | 0.02033 | 0.00058 |
| Flavor | 3 mo. | 0.01667 | 0.00058 |
| Formulation | 9 mo. | 0.01700 | 0.00000 |
| (with strip) | 12 mo. | 0.01700 | 0.00173 |

| Sample | Duration | Avg Myosmine μg/g | Std. Dev. |
|---|---|---|---|
| Flavor | 3 mo. | 0.02333 | 0.00153 |
| Formulation | 9 mo. | 0.03833 | 0.00404 |
| (no strip) | 12 mo. | 0.04233 | 0.00153 |
| Flavor | 3 mo. | 0.01677 | 0.00058 |
| Formulation | 9 mo. | 0.01600 | 0.00100 |
| (with strip) | 12 mo. | 0.01633 | 0.00153 |

| Sample | Duration | Avg Nornicotine μg/g | Std. Dev. |
|---|---|---|---|
| Flavor | 3 mo. | — | — |
| Formulation | 9 mo. | 0.01667 | 0.00404 |
| (no strip) | 12 mo. | 0.01867 | 0.00252 |
| Flavor | 3 mo. | — | — |
| Formulation | 9 mo. | 0.01550 | 0.00636 |
| (with strip) | 12 mo. | 0.01350 | 0.00495 |

A performance of the cartridge can be quantified in terms of a quantity of vapor mass production per puff, where a higher vapor mass production indicates a greater cartridge performance. Vapor, aerosol and dispersion are terms used interchangeably and are meant to cover the matter generated or output by an e-vapor device. Tabulated test data for cartridge performance at an ambient temperature of 24° C. and 60% relative humidity is included below for an example embodiment. A control group involving a cartridge in a gas/moisture impermeable pouch, without the existence of an oxygen scavenger strip, was used in these tests.

| Sample | Duration | Avg. mg/puff | Std. Dev. |
|---|---|---|---|
| Flavor | 3 months | 5.64000 | 0.21077 |
| Formulation | 9 months | 5.63167 | 0.17559 |
| (no strip) | 12 months | 5.55500 | 0.39214 |
| Flavor | 3 months | 5.77667 | 0.11015 |
| Formulation | 9 months | 5.59667 | 0.34064 |
| (with strip) | 12 months | 6.10500 | 0.23468 |

Figure 12:
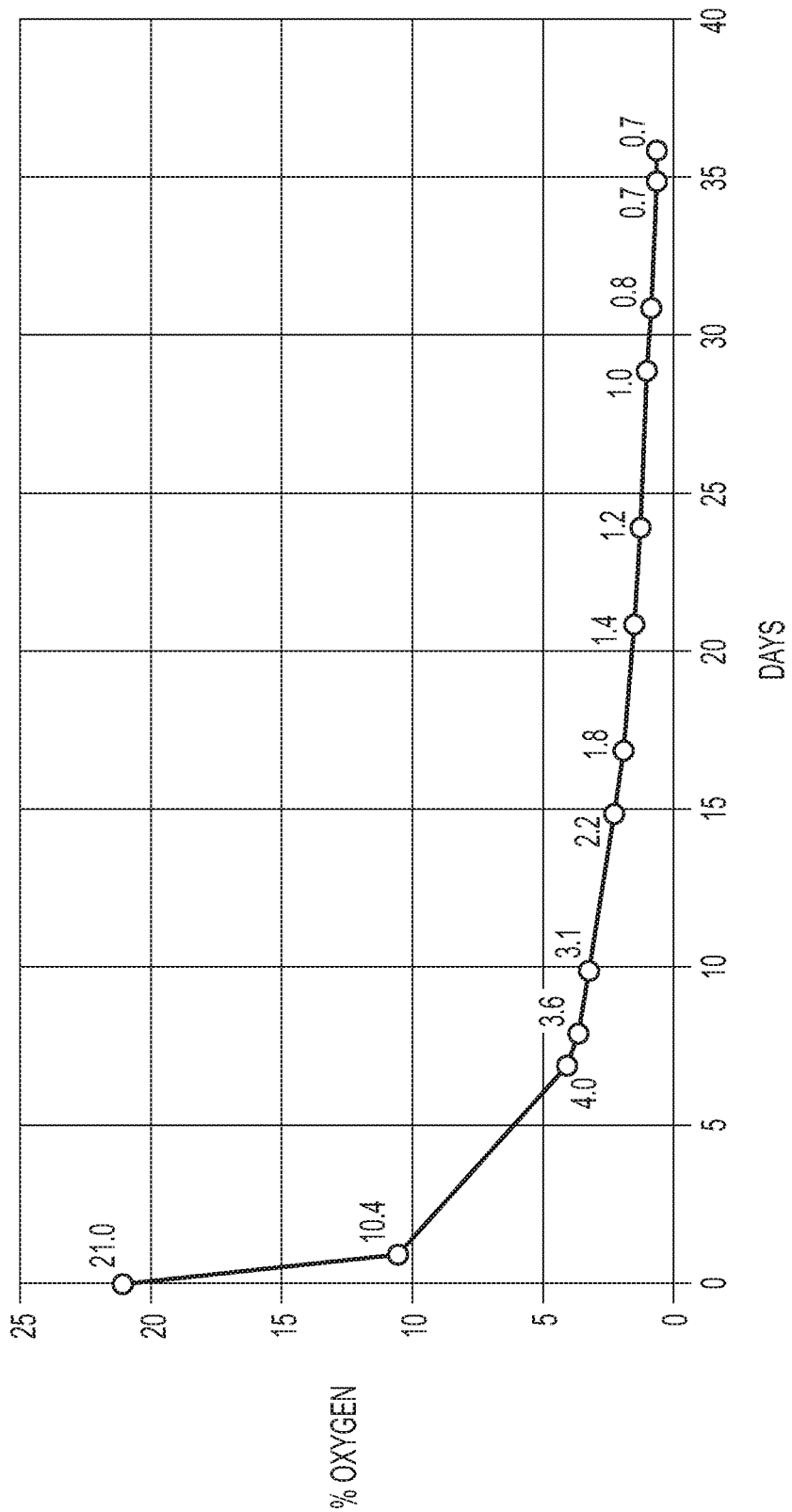
FIG. 12 is a chart illustrating a reduction in oxygen levels in a gas/moisture impermeable pouch with an oxygen scavenger, in accordance with an example embodiment.

FIG. 12 is a chart illustrating a reduction in oxygen levels in a gas/moisture impermeable pouch with an oxygen scavenger, in accordance with an example embodiment. Specifically, this chart shows test data for an oxygen scavenger strip in a sealed gas/moisture impermeable pouch with an inner cavity initially containing 5.8 ml of ambient air (where oxygen comprises about 21% of this initial volume), the oxygen scavenger is able to reduce the oxygen concentration to about 1.0% within an initial period of approximately 30 days, where the oxygen concentration may continue to decline to near negligible levels (less than 0.1% by volume) as the test results approach 40 days of testing.

Adherence of Oxygen Scavenger to Pouch Material According to Some Example Embodiments In an example embodiment, adherence of an oxygen scavenger 30 to an inner surface 10c of a pouch material 10 is accomplished through a combined application of heat and pressure, where the adherence is a function of three parameters: an intensity of the applied heat, an intensity of the applied pressure, and the duration of time that the heat and pressure are applied to the oxygen scavenger, and where the applied heat exceeds a melting point of the oxygen scavenger 30 material. In an example embodiment, for an oxygen scavenger 30 with iron fragments in a polyethylene matrix, the applied heat brings the oxygen scavenger 30 to a temperature that of about 150° C., or a temperature is equal to or greater than 150° C.

Pre-Vapor Formulation Including a Flavor System According to Some Example Embodiments In an example embodiment, the consumable item 20 is an e-vaping cartridge, where the cartridge includes a flavor system. In some examples, the flavor system includes a pre-vapor formulation. The pre-vapor formulation may be a liquid, a solid and/or a gel formulation including, but not limited to, water, beads, solvents, active ingredients, ethanol, plants, plant extracts, natural or artificial flavors, and/or vapor formers such as glycerin and propylene glycol.

In an example embodiment, the pre-vapor formulation includes volatile tobacco flavor compounds which are released upon heating. The pre-vapor formulation may also include tobacco elements dispersed throughout the formulation. For example, the tobacco element may be 2-30% by weight within the pre-vapor formulation. Alternatively, the pre-vapor formulation may be flavored with other flavors besides a tobacco flavor, or in addition to a tobacco flavor.

In an example embodiment, a vapor former of the pre-vapor formulation may include a diol (such as propylene glycol and/or 1,3-propanediol), glycerin and combinations thereof. In an example embodiment, a vapor former is included in an amount ranging from about 20% by weight based on the weight of the pre-vapor formulation to about 90% by weight based on the weight of the pre-vapor formulation (for example, the vapor former is in the range of about 50% to about 80%, more preferably about 55% to 75%, or most preferably about 60% to 70%). Moreover, in an example embodiment, the pre-vapor formulation includes a diol and glycerin in a weight ratio that ranges from about 1:4 to 4:1, where the diol is propylene glycol, or 1,3-propanediol, or combinations thereof. This ratio is preferably about 3:2.

In an example embodiment, the pre-vapor formulation also includes water. Water may be included in an amount ranging from about 5% by weight based on the weight of the pre-vapor formulation to about 40% by weight based on the weight of the pre-vapor formulation, and more preferably in an amount ranging from about 10% by weight based on the weight of the pre-vapor formulation to about 15% by weight based on the weight of the pre-vapor formulation. In an example embodiment, the remaining portion of the pre-vapor formulation that is not water (and nicotine and/or flavoring compounds), is the vapor former (described above), where the vapor former is between 30% by weight and 70% by weight propylene glycol, and the balance of the vapor former is glycerin.

The pre-vapor formulation optionally may include one or more flavorants in an amount ranging from about 0.2% to about 15% by weight (for instance, the flavorant may be in the range of about 1% to 12%, more preferably about 2% to 10%, and most preferably about 5% to 8%). The flavorant or flavorants may include a natural flavorant, or an artificial flavorant. For instance, a flavorant may include tobacco flavor, menthol, wintergreen, peppermint, herb flavors, fruit flavors, nut flavors, liquor flavors, roasted, minty, savory, cinnamon, clove, etc., and combinations thereof. In an example embodiment, a pre-vapor formulation includes nicotine. In an example embodiment, a portion of the pre-vapor formulation that is not nicotine and/or a flavorant, includes 10-15% by weight water, where the remaining portion of the non-nicotine and non-flavorant portion of the formulation is a mixture of propylene glycol and a vapor former that is in a ratio that ranges between 60:40 and 40:60 by weight. These are just some examples of consumable items that may be stored within a pouch of embodiments disclosed herein, but any other type of consumable items may be stored with a pouch of embodiments disclosed herein, for example, any consumable item that may benefit from being stored in an environment with reduced oxygen.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A pouch, comprising:
   a pouch material defining an inner cavity, the pouch material including a first polymer layer and a gas impermeable layer, a first surface of the first polymer layer forming an inner surface of the inner cavity;
   a consumable item in the inner cavity; and
   an oxygen scavenger, the oxygen scavenger including at least one active element dispersed within a matrix material, at least one first portion of the oxygen scavenger being infused within the first surface of the first polymer layer, the first polymer layer and the matrix material both including a first polymer material.

2. The pouch of claim 1, wherein the gas impermeable layer is moisture impermeable.

3. The pouch of claim 1, wherein the oxygen scavenger is adhered to the first polymer layer by the matrix material being at least partially melted into the first polymer layer.

4. The pouch of claim 1, wherein the pouch includes a seam, at least one second portion of the oxygen scavenger is at least partially enveloped within the seam, and an end of the at least one second portion of the oxygen scavenger extends from the seam into the inner cavity.

5. The pouch of claim 1, wherein the gas impermeable layer includes:
a foil layer.

6. The pouch of claim 5, wherein the foil layer forms an outer surface of the pouch material.

7. The pouch of claim 5, wherein the pouch material further comprises:
a second polymer layer on an outer surface of the pouch material.

8. The pouch of claim 7, wherein the gas impermeable layer is directly connected to the first polymer layer and the second polymer layer.

9. The pouch of claim 7, wherein the pouch material further includes:
a third polymer layer between the second polymer layer and the foil layer; and
an adhesive between the first polymer layer and the foil layer.

10. The pouch of claim 9, wherein
the first polymer layer and the third polymer layer are made from at least one of polyethylene or a polyethylene based sealant, and
the second polymer layer is a layer of biaxially-oriented polyethylene terephthalate (BOPET).

11. The pouch of claim 5, wherein the first polymer layer has a lower melting point than the foil layer.

12. The pouch of claim 1, wherein the at least one active element includes iron fragments.

13. The pouch of claim 1, wherein the first polymer material has a melting point between about 137° C. and 205° C.

14. The pouch of claim 1, further comprising:
a light-sensitive activator configured to bind with free-oxygen to activate the at least one active element following an exposure to light.

15. The pouch of claim 14, wherein the light-sensitive activator is a uni-molecular free-radical generating photo-initiator.

16. The pouch of claim 14, wherein the light-sensitive activator is homogeneously mixed with the at least one active element.

17. The pouch of claim 14, wherein the light-sensitive activator is infused within the oxygen scavenger.

18. The pouch of claim 1, wherein the oxygen scavenger is configured to reduce an oxygen level in the inner cavity to a level that is 2% oxygen or less within a period of 30 days or less, and an initial gas in the inner cavity is ambient air.

19. The pouch of claim 1, wherein the oxygen scavenger is configured to reduce an oxygen level in the inner cavity to a level that is 2% oxygen or less within a period of 17 days or less, and an initial gas in the inner cavity is ambient air.

20. The pouch of claim 1, wherein the oxygen scavenger is configured to reduce an oxygen level in the inner cavity to a level that is 1% oxygen or less within a period of 30 days or less, and an initial gas in the inner cavity is ambient air.

21. The pouch of claim 1, wherein the consumable item is a part of an e-vaping device that includes a pre-vapor formulation.

22. The pouch of claim 1, wherein the first polymer material is configured to allow oxygen migration through the first polymer material.

23. The pouch of claim 1, wherein the first polymer layer and the matrix material have substantially a same melting point.

24. A pouch, comprising:
a pouch material defining an inner cavity, the pouch material including a first polymer layer and a foil layer, a first surface of the first polymer layer forming an inner surface of the inner cavity;
a consumable item in the inner cavity; and
an oxygen scavenger, the oxygen scavenger including at least one active element dispersed within a matrix material, at least one first portion of the oxygen scavenger being infused within the first surface of the first polymer layer, the first polymer layer and the matrix material both including a first polymer material.

25. The pouch of claim 24, wherein the foil layer forms an outer surface of the pouch material.

26. The pouch of claim 24, wherein the first polymer layer and the matrix material have substantially a same melting point.

27. The pouch of claim 24, wherein the first polymer material is configured to allow oxygen migration through the first polymer material.

28. The pouch of claim 24, wherein the foil layer is gas impermeable.

29. The pouch of claim 24, wherein the foil layer is moisture impermeable.

30. The pouch of claim 24, wherein the oxygen scavenger is adhered to the first polymer layer by the matrix material being at least partially melted into the first polymer layer.

31. The pouch of claim 24, wherein the pouch includes a seam, at least one second portion of the oxygen scavenger is at least partially enveloped within the seam, and an end of the at least one second portion of the oxygen scavenger extends from the seam into the inner cavity.

32. The pouch of claim 24, wherein the pouch material further comprises:
a second polymer layer on an outer surface of the pouch material.

33. The pouch of claim 32, wherein the foil layer is directly connected to the first polymer layer and the second polymer layer.

34. The pouch of claim 32, wherein the pouch material further includes:
a third polymer layer between the second polymer layer and the foil layer; and
an adhesive between the first polymer layer and the foil layer.

35. The pouch of claim 34, wherein
the first polymer layer and the third polymer layer are made from at least one of polyethylene or a polyethylene based sealant, and
the second polymer layer is a layer of biaxially-oriented polyethylene terephthalate (BOPET).

36. The pouch of claim 24, wherein the first polymer layer has a lower melting point than the foil layer.

37. The pouch of claim 24, wherein the at least one active element includes iron fragments.

38. The pouch of claim 24, wherein the first polymer material has a melting point between about 137° C. and 205° C.

39. The pouch of claim 24, further comprising:
a light-sensitive activator configured to bind with free-oxygen to activate the at least one active element following an exposure to light.

40. The pouch of claim 39, wherein the light-sensitive activator is a uni-molecular free-radical generating photo-initiator.

41. The pouch of claim 39, wherein the light-sensitive activator is homogeneously mixed with the at least one active element.

42. The pouch of claim 39, wherein the light-sensitive activator is infused within the oxygen scavenger.

43. The pouch of claim 24, wherein the oxygen scavenger is configured to reduce an oxygen level in the inner cavity to a level that is 2% oxygen or less within a period of 30 days or less, and an initial gas in the inner cavity is ambient air.

44. The pouch of claim 24, wherein the oxygen scavenger is configured to reduce an oxygen level in the inner cavity to a level that is 2% oxygen or less within a period of 17 days or less, and an initial gas in the inner cavity is ambient air.

45. The pouch of claim 24, wherein the oxygen scavenger is configured to reduce an oxygen level in the inner cavity to a level that is 1% oxygen or less within a period of 30 days or less, and an initial gas in the inner cavity is ambient air.

46. The pouch of claim 24, wherein the consumable item is a part of an e-vaping device that includes a pre-vapor formulation.

\* \* \* \* \*